US008087995B2

(12) United States Patent
Englman et al.

(10) Patent No.: US 8,087,995 B2

(45) Date of Patent: Jan. 3, 2012

(54) WAGERING GAME WITH PERSISTENT STATE OF GAME ASSETS AFFECTING OTHER PLAYERS

(75) Inventors: Allon G. Englman, Chicago, IL (US); Larry J. Pacey, Chicago, IL (US); Mark B. Gagner, West Chicago, IL (US); Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 699 days.

(21) Appl. No.: 12/210,824

(22) Filed: Sep. 15, 2008

(65) Prior Publication Data

US 2009/0011823 A1 Jan. 8, 2009

Related U.S. Application Data

(62) Division of application No. 12/281,581, filed as application No. PCT/US2007/005064 on Feb. 26, 2007.

(60) Provisional application No. 60/779,828, filed on Mar. 7, 2006.

(51) Int. Cl.
*A63F 13/00* (2006.01)
*A63F 13/10* (2006.01)

(52) U.S. Cl. ................ 463/23; 463/16; 463/20; 463/25; 463/42; 273/138.1; 273/139

(58) Field of Classification Search .............. 463/10–13, 463/16, 20–22, 25, 29, 40–42, 23; 273/138.1, 273/139, 142 B, 142 A, 142 J, 148 A, 149 P, 273/149 R, 243, 292–293, 304, 306, 309; *A63F 13/00, 13/10*
See application file for complete search history.

(56) References Cited

U.S. PATENT DOCUMENTS

| | | | | |
|---|---|---|---|---|
| 4,752,068 | A | 6/1988 | Endo | 273/1 |
| 5,083,271 | A | 1/1992 | Thacher et al. | 364/411 |
| 5,393,057 | A | 2/1995 | Marnell, II | 273/85 |
| 5,575,474 | A | 11/1996 | Rossides | 463/26 |

(Continued)

FOREIGN PATENT DOCUMENTS

WO WO 99/29381 A2 6/1999

(Continued)

OTHER PUBLICATIONS

International Search Report for International Application No. PCT/US2007/05064 dated May 5, 2008 (4 pages).

(Continued)

*Primary Examiner* — Arthur O. Hall
(74) *Attorney, Agent, or Firm* — Nixon Peabody LLP

(57) ABSTRACT

A gaming system includes a plurality of linked gaming machines, each gaming machine including a display for displaying a plurality of symbols that indicates a randomly selected outcome of a wagering game. The randomly selected outcome is selected from a plurality of outcomes in response to a wager input. Each gaming machine allows a player to achieve a player level from a plurality of player levels. The gaming system further includes a controller linked to the gaming machines. The controller is adapted to permit a certain community-event game from a plurality of community-game events to be played at two or more of gaming machines in response to a conditional state at the gaming machines. The conditional state is a function of the player levels at the gaming machines.

21 Claims, 15 Drawing Sheets

U.S. PATENT DOCUMENTS 5,580,309 A 12/1996 Piechowiak et al. ............ 463/16
5,609,525 A 3/1997 Ohno et al. ..................... 463/43
5,711,715 A 1/1998 Ringo et al. ...................... 473/9
5,755,621 A 5/1998 Marks et al. .................... 463/42
5,779,242 A 7/1998 Kaufmann .................... 273/459
5,779,549 A 7/1998 Walker et al. ................... 463/42
5,830,063 A 11/1998 Byrne ............................ 463/18
5,833,537 A 11/1998 Barrie ............................ 463/21
5,957,775 A 9/1999 Cherry ........................... 463/16
6,004,211 A 12/1999 Brenner et al. ................. 463/42
6,012,045 A 1/2000 Barzilai ......................... 705/26
6,012,982 A 1/2000 Piechowiak .................... 463/16
6,012,983 A 1/2000 Walker et al. ................... 463/20
6,015,344 A 1/2000 Kelly ............................. 463/16
6,039,648 A 3/2000 Guinn et al. .................... 463/16
6,077,162 A 6/2000 Weiss ............................. 463/26
6,077,163 A 6/2000 Walker et al. ................... 463/26
6,089,980 A 7/2000 Gauselmann ................... 463/27
6,093,100 A 7/2000 Singer et al. .................... 463/13
6,113,098 A 9/2000 Adams .......................... 273/143
6,142,872 A 11/2000 Walker et al. ................... 463/16
6,165,071 A 12/2000 Weiss ............................. 463/24
6,168,523 B1 1/2001 Piechowiak et al. ............ 463/26
6,206,782 B1 3/2001 Walker et al. ................... 463/25
6,217,448 B1 * 4/2001 Olsen ............................. 463/25
6,224,486 B1 5/2001 Walker et al. ................... 463/42
6,234,896 B1 5/2001 Walker et al. ................... 463/16
6,254,481 B1 7/2001 Jaffe .............................. 463/20
6,273,820 B1 8/2001 Haste, III ........................ 463/40
6,287,202 B1 9/2001 Pascal ............................ 463/42
6,293,865 B1 9/2001 Kelly et al. ..................... 463/16
6,302,790 B1 10/2001 Brossard ........................ 463/20
6,309,299 B1 10/2001 Weiss ............................. 463/20
6,311,976 B1 11/2001 Yoseloff ..................... 273/138.2
6,312,332 B1 11/2001 Walker et al. ................... 463/23
6,319,127 B1 11/2001 Walker et al. ................... 463/26
6,331,144 B1 * 12/2001 Walker et al. ................... 463/20
6,336,862 B1 1/2002 Byrne ............................ 463/27
6,361,441 B1 3/2002 Walker et al. ................... 463/42
6,364,314 B1 4/2002 Canterbury ................... 273/274
6,364,765 B1 4/2002 Walker et al. ................... 463/16
6,365,765 B1 4/2002 Baldwin et al. ............... 556/440
6,416,408 B2 7/2002 Tracy et al. ..................... 463/16
6,425,828 B2 7/2002 Walker et al. ................... 463/42
6,431,983 B2 8/2002 Acres ............................. 463/25
6,503,146 B2 1/2003 Walker et al. ................... 463/25
6,506,117 B2 1/2003 DeMar et al. ................... 463/20
6,506,118 B1 1/2003 Baerlocher et al. ............. 463/25
6,575,832 B1 * 6/2003 Manfredi et al. ............... 463/25
6,648,753 B1 11/2003 Tracy et al. ..................... 463/16
6,663,489 B2 12/2003 Baerlocher ..................... 463/20
6,692,354 B2 2/2004 Tracy et al. ..................... 463/16
6,712,699 B2 3/2004 Walker et al.
6,722,981 B2 4/2004 Kaminkow et al. ............. 463/25
6,722,985 B2 4/2004 Criss-Pusszkiewicz et al. ............................... 463/29
6,733,390 B2 5/2004 Walker et al. ................... 463/23
6,745,236 B1 6/2004 Hawkins et al. ................ 463/29
6,758,757 B2 7/2004 Luciano, Jr. et al. ........... 463/43
6,776,713 B2 8/2004 Gauselmann ................... 463/16
6,780,111 B2 8/2004 Cannon et al. .................. 463/25
6,800,026 B2 10/2004 Cannon ........................... 463/16
6,800,027 B2 10/2004 Giobbi et al. ................... 463/24
6,811,486 B1 11/2004 Luciano, Jr. .................... 463/24
6,817,948 B2 11/2004 Pascal et al. .................... 463/42
6,837,793 B2 1/2005 McClintic ....................... 463/42
6,869,361 B2 * 3/2005 Sharpless et al. ............... 463/25
6,887,154 B1 5/2005 Luciano, Jr. et al. ........... 463/26
6,908,390 B2 6/2005 Nguyen et al. .................. 463/42
6,923,721 B2 8/2005 Luciano et al. ................. 463/24
7,077,744 B2 7/2006 Cannon ........................... 463/20
7,147,557 B1 12/2006 Tracy et al. ..................... 463/16
7,169,041 B2 1/2007 Tessmer et al. ................. 463/25
7,175,521 B2 * 2/2007 McClintic ......................... 463/9
7,182,690 B2 2/2007 Giobbi et al.
7,314,408 B2 * 1/2008 Cannon ........................... 463/16
7,458,889 B2 * 12/2008 Gauselmann ................... 463/16
7,798,899 B2 * 9/2010 Acres ............................. 463/29
7,963,847 B2 * 6/2011 Baerlocher ..................... 463/27
2001/0024971 A1 9/2001 Brossard ........................ 463/30
2002/0010025 A1 1/2002 Kelly et al. ..................... 463/42
2002/0028708 A1 3/2002 Busch et al. .................... 463/42
2002/0039919 A1 4/2002 Joshi et al. ...................... 463/20
2002/0039923 A1 * 4/2002 Cannon et al. .................. 463/42
2002/0077173 A1 6/2002 Luciano et al. ................. 463/25
2002/0077174 A1 6/2002 Luciano et al. ................. 463/25
2002/0093136 A1 7/2002 Moody ......................... 273/139
2002/0094871 A1 7/2002 Luciano, Jr. et al. ........... 463/43
2002/0107065 A1 8/2002 Rowe ............................. 463/20
2002/0111209 A1 8/2002 Walker et al. ................... 463/25
2002/0119824 A1 8/2002 Allen ............................. 463/42
2002/0151349 A1 10/2002 Joshi .............................. 463/20
2002/0196342 A1 12/2002 Walker et al. ................. 348/157
2003/0013515 A1 1/2003 Rowe et al. ..................... 463/25
2003/0013531 A1 1/2003 Rowe et al. ..................... 463/42
2003/0036422 A1 2/2003 Baerlocher et al. ............. 463/20
2003/0036427 A1 2/2003 Brandstetter et al. ........... 463/29
2003/0036430 A1 2/2003 Cannon ........................... 463/42
2003/0060264 A1 3/2003 Chilton et al. .................. 463/20
2003/0064794 A1 4/2003 Mead et al. ..................... 463/25
2003/0064807 A1 4/2003 Walker et al. ................... 463/42
2003/0078101 A1 4/2003 Schneider et al. .............. 463/42
2003/0100362 A1 5/2003 Hornik et al. ................... 463/25
2003/0106769 A1 6/2003 Weiss ........................... 194/201
2003/0114218 A1 6/2003 McClintic ....................... 463/42
2003/0114219 A1 6/2003 McClintic ....................... 463/25
2003/0119576 A1 6/2003 McClintic et al. .............. 463/20
2003/0119579 A1 6/2003 Walker et al. ................... 463/20
2003/0157979 A1 8/2003 Cannon et al. .................. 463/16
2003/0186733 A1 10/2003 Wolf et al. ...................... 463/16
2003/0195024 A1 10/2003 Slattery ............................ 463/9
2003/0211881 A1 11/2003 Walker et al. ................... 463/20
2003/0224852 A1 12/2003 Walker et al. ................... 463/20
2003/0236116 A1 12/2003 Marks et al. .................... 463/16
2004/0053680 A1 3/2004 Schultz .......................... 463/20
2004/0087368 A1 5/2004 Gauselmann ................... 463/42
2004/0106448 A1 * 6/2004 Gauselmann ................... 463/25
2004/0142742 A1 7/2004 Schneider et al. .............. 463/25
2004/0204226 A1 10/2004 Foster et al. .................... 463/20
2004/0229700 A1 * 11/2004 Cannon et al. .................. 463/42
2004/0235552 A1 11/2004 Gauselmann ................... 463/16
2005/0003886 A1 1/2005 Englman et al. ................ 463/25
2005/0009601 A1 * 1/2005 Manfredi et al. ............... 463/29
2005/0014554 A1 1/2005 Walker et al. ................... 463/20
2005/0020352 A1 1/2005 Chilton et al. .................. 463/20
2005/0026674 A1 2/2005 Wolf et al. ...................... 463/16
2005/0043088 A1 2/2005 Nguyen et al. .................. 463/29
2005/0043089 A1 2/2005 Nguyen et al. .................. 463/42
2005/0043094 A1 2/2005 Nguyen et al. .................. 463/42
2005/0071024 A1 3/2005 Henshaw ........................ 700/91
2005/0102047 A1 5/2005 Ottofy ............................ 700/91
2005/0148380 A1 7/2005 Cannon et al. .................. 463/16
2005/0159207 A1 7/2005 Thomas .......................... 463/20
2006/0009283 A1 * 1/2006 Englman et al. ................ 463/29
2006/0068893 A1 3/2006 Jaffe et al. ....................... 463/20
2006/0073880 A1 4/2006 Thomas .......................... 463/20
2006/0073897 A1 4/2006 Englman et al. ................ 463/42
2006/0079316 A1 4/2006 Flemming et al. .............. 463/25
2006/0079317 A1 4/2006 Flemming et al. .............. 463/25
2006/0084495 A1 4/2006 Jaffe et al. ....................... 463/20
2006/0089194 A1 4/2006 Joshi et al. ...................... 463/25
2006/0121971 A1 * 6/2006 Slomiany et al. ............... 463/16
2006/0135243 A1 6/2006 Englman et al. ................ 463/16
2006/0148548 A1 * 7/2006 Hornik et al. ................... 463/16
2006/0160625 A1 7/2006 Englman et al. ................ 463/42
2006/0189378 A1 8/2006 Aoki .............................. 463/20
2006/0211479 A1 9/2006 Walker et al. ................... 463/16
2006/0211480 A1 9/2006 Walker et al. ................... 463/16
2006/0217176 A1 9/2006 Walker et al. ................... 463/16
2006/0240887 A1 10/2006 Walker et al. ................... 463/16
2006/0240889 A1 10/2006 Walker et al. ................... 463/16
2006/0247012 A1 11/2006 Walker et al. ................... 463/20
2006/0287043 A1 12/2006 Englman et al. ................ 463/16
2008/0045341 A1 * 2/2008 Englman ......................... 463/42
2009/0176556 A1 * 7/2009 Gagner et al. .................. 463/25

| | | | | | |
|---|---|---|---|---|---|
| 2009/0253483 | A1 * | 10/2009 | Pacey et al. | ..................... | 463/20 |
| 2010/0137052 | A1 * | 6/2010 | Bennett | ........................... | 463/16 |
| 2010/0331076 | A1 * | 12/2010 | Dickerson | ....................... | 463/26 |

FOREIGN PATENT DOCUMENTS

| | | | |
|---|---|---|---|
| WO | WO 01/32276 | A2 | 5/2001 |
| WO | WO 02/094399 | A2 | 11/2002 |
| WO | WO 2004/025585 | A2 | 3/2004 |
| WO | WO 2004025585 | A2 * | 3/2004 |
| WO | WO 2005/010834 | A1 | 2/2005 |
| WO | WO 2005/029279 | A2 | 3/2005 |
| WO | WO 2005/077480 | A1 | 8/2005 |
| WO | WO 2005/082480 | A1 | 9/2005 |
| WO | WO 2005/110563 | A2 | 11/2005 |
| WO | WO 2005/110563 | A3 | 11/2005 |
| WO | WO 2005/113088 | A1 | 12/2005 |
| WO | WO 2006/002241 | A2 | 1/2006 |
| WO | WO 2006/004831 | A2 | 1/2006 |
| WO | WO 2006/004832 | A2 | 1/2006 |
| WO | WO 2006/005073 | A2 | 1/2006 |
| WO | WO 2006/015442 | A1 | 2/2006 |
| WO | WO 2006/017036 | A1 | 2/2006 |
| WO | WO 2006/017067 | A1 | 2/2006 |
| WO | WO 2006/017068 | A1 | 2/2006 |
| WO | WO 2006/020811 | A2 | 2/2006 |
| WO | WO 2006/026250 | A2 | 3/2006 |
| WO | WO 2006/028740 | A2 | 3/2006 |
| WO | WO 2006/044252 | A2 | 4/2006 |
| WO | WO 2006/121663 | A2 | 11/2006 |
| WO | WO 2006/124441 | A2 | 11/2006 |
| WO | WO 2007/006002 | A2 | 1/2007 |
| WO | WO 2007/030552 | A2 | 3/2007 |
| WO | WO 2007/030632 | A2 | 3/2007 |
| WO | WO 2007/030675 | A2 | 3/2007 |
| WO | WO 2007/030733 | A2 | 3/2007 |
| WO | WO 2007/030801 | A2 | 3/2007 |
| WO | WO 2007/032945 | A2 | 3/2007 |

OTHER PUBLICATIONS

International Written Opinion for International Application No. PCT/US2007/05064 dated May 5, 2008 (11 pages).

* cited by examiner

WAGERING GAME WITH PERSISTENT STATE OF GAME ASSETS AFFECTING OTHER PLAYERS

CROSS REFERENCE TO RELATED APPLICATIONS

This application is a divisional of U.S. patent application Ser. No. 12/281,581, filed on Sep. 3, 2008, which is a U.S. national stage of International Application No. PCT/US2007/005064, filed Feb. 26, 2007, which is related to and claims priority to U.S. Provisional Application No. 60/779,828, filed Mar. 7, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and methods for playing wagering games, and more particularly, to a wagering game that allows a player to accumulate game assets that affect other players.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present invention, a gaming system includes a plurality of linked gaming machines, each gaming machine including a display for displaying a plurality of symbols that indicates a randomly selected outcome of a wagering game. The randomly selected outcome is selected from a plurality of outcomes in response to a wager input. Each gaming machine allows a player to achieve a player level from a plurality of player levels. The gaming system further includes a controller linked to the gaming machines. The controller is adapted to permit a certain community-event game from a plurality of community-game events to be played at two or more of gaming machines in response to a conditional state at the gaming machines. The conditional state is a function of the player levels at the gaming machines.

According to another aspect of the present invention, a method includes conducting wagering games at a plurality of gaming machines. Each of the plurality of gaming machines provides access to a plurality of community events. The method further includes selecting a community event from the plurality of community events to be played at two or more eligible gaming machines within the plurality of gaming machines. The selecting step is based on player levels of players at the plurality of gaming machines. The method also includes playing the selected community event at the two or more eligible gaming machines.

According to yet another aspect of the present invention, a gaming system includes a plurality of linked gaming machines. Each of the gaming machines includes a display for displaying a plurality of symbols that indicate a randomly selected outcome that has been selected from a plurality of outcomes in response to a wager input. Each of the gaming machines allows a player to achieve a player level from a plurality of player levels. The gaming system further includes a controller linked to the plurality of linked gaming machines and is adapted to permit a selection of a certain community-event game from a plurality of community-game events. The community-game events are played at two or more of the gaming machines in response to a community-game activation event at the gaming machines. The selection of the certain community-event game is made by one or more players based on the player levels at the gaming machines.

According to yet another aspect of the present invention, a method of playing a wagering game includes conducting, via a first player, the wagering game at a gaming machine. The wagering game has a plurality of symbols that indicate a randomly selected outcome that has been selected from a plurality of outcomes in response to a wager input. At least one of the outcomes provides an asset that can be saved by the first player for use during a subsequent gaming session. The method further includes providing the first player with an opportunity to convey the asset to a second player to encourage the second player to play the wagering game. The method also includes, in response to the first player conveying the asset, providing the first player with a game-enhancement parameter to be applied to the wagering game.

According to yet another aspect of the present invention, a method of playing a wagering game includes conducting wagering games at a plurality of linked gaming machines. Each of the wagering games has a plurality of symbols that indicate a randomly selected outcome that has been selected from a plurality of outcomes in response to a wager input. The method further includes, for each of the players, determining a player level based on certain criteria occurring at the respective one of the gaming machines. The player level fluctuates during a gaming session in which the wagering game is played multiple times. The method also includes, in response to a community-game triggering event, selecting a community game from a plurality of community games based on the player levels of the players at the gaming machines that are eligible for the community game at the time the community-game triggering event occurs.

According to yet another aspect of the present invention, a method of playing a wagering game includes conducting wagering games at a plurality of linked gaming machines. Each of the wagering games has a plurality of symbols that indicate a randomly selected outcome of the wagering game that has been selected from a plurality of outcomes in response to a wager input. The wager input is received from a plurality of players. The method further includes, for each of the players at a respective one of the gaming machines, determining a player level based on certain criteria occurring at the respective one of the gaming machines. The method also includes assigning a payback percentage to each of the gaming machines based on a player level of the player at the respective one of the gaming machines and the player levels at the gaming machines.

According to yet another aspect of the present invention, a method of playing a wagering game includes conducting wagering games at a plurality of linked gaming machines including a first gaming machine and a second gaming machine. Each of the wagering games has a plurality of symbols that indicate a randomly selected outcome that has been selected from a plurality of outcomes in response to a wager input. The wager input is received from a plurality of players including a first player, a second player, and a third player. The method further includes determining a first player level of the first player, the second player, and the third player based on certain criteria. The method also includes assigning a first payback percentage to the first gaming machine based on the first player level and the second player level when the first player plays the first gaming machine and the second player plays the second gaming machine. The method also includes assigning a second payback percentage to the first gaming machine based on the first player level and the third player level when the first player plays the first gaming machine and the third player plays the second gaming machine.

According to yet another aspect of the present invention, a method for conducting a wagering game includes conducting a first wagering game at a first gaming machine. The first gaming machine provides access to a plurality of community events and a first player at the first gaming machine has a first player-level status. The method further includes conducting a second wagering game at a second gaming machine that is linked to the first gaming machine. The second gaming machine provides access to the plurality of community events and a second player at the second gaming machine has a second player-level status. The method also includes increasing the second player-level status to a modified player-level status by a transfer from the first player. The method also includes, in response to the first player-level status and the modified player-level status at the first gaming machine and the second gaming machine, respectively, accessing a certain community event from the plurality of community events.

According to yet another aspect of the present invention, a method for conducting a wagering game is directed to conducting a first wagering game at a first gaming machine. The first gaming machine provides access to a first special event in response to a first collection, by a first player, of a set of assets including at least a first asset and a second asset. A second wagering game is conducted at a second gaming machine linked to the first gaming machine, wherein the second gaming machine provides access to a second special event in response to a second collection, by a second player, of the set of assets including at least the first asset and the second asset. The first asset is awarded to the first player at the first gaming machine and the second asset is awarded to the second player at the second gaming machine. The second player is allowed to transfer the second asset to the first player such that the first player may access the special event.

According to yet another aspect of the present invention, a method of playing a plurality of wagering games is directed to conducting the wagering games at a plurality of linked gaming machines. The wagering games provide assets that can be accumulated by players at the gaming machines. A special award is provided to the players in response to a cumulative value of the assets of the players being a predetermined value. Assets of a new player are added to the cumulative value in response to the new player beginning play at one of the plurality of linked gaming machines.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

DESCRIPTION OF ILLUSTRATIVE EMBODIMENTS

Figure 1:
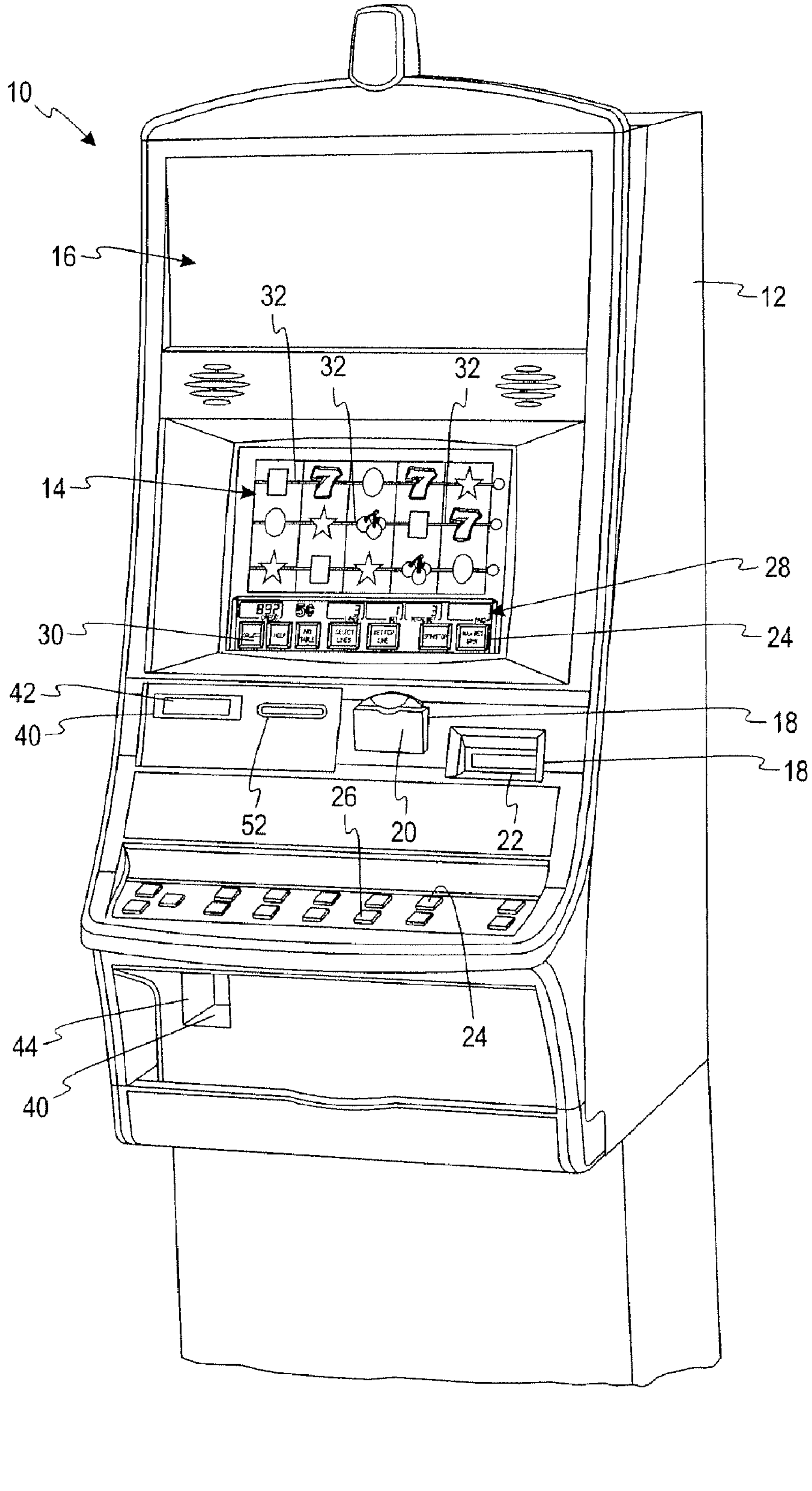
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
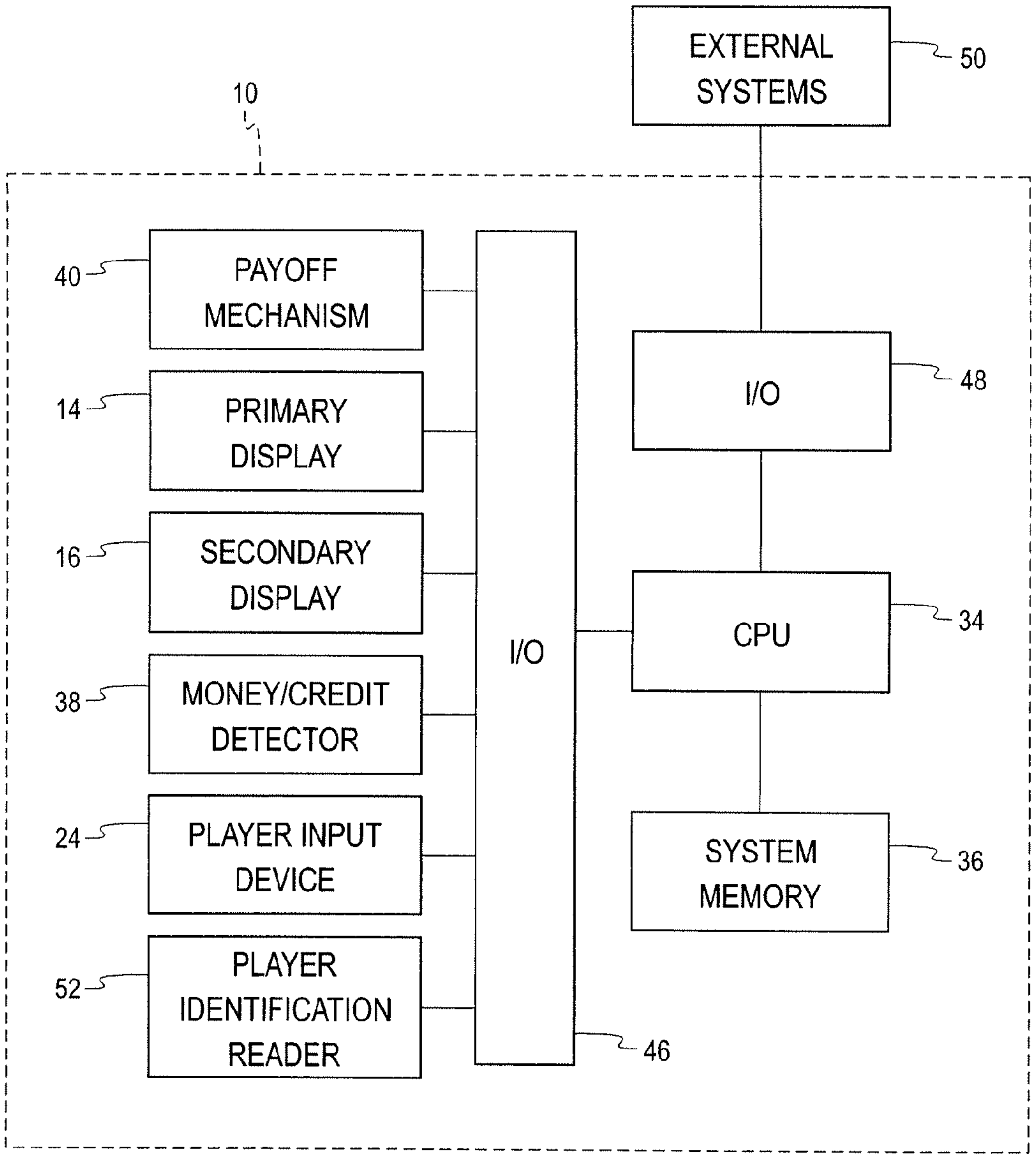
FIG. 2 is a block diagram of a control system suitable for operating the gaming machine of FIG. 1.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3A:
FIG. 3*a* shows a main display of the gaming machine of FIG. 1 indicating to a new player a stored game asset received from a recruiting player, according to one embodiment of the present invention.

Referring to FIG. 3*a*, the main display 14 shows a message to a new player indicating a transfer of a stored game asset from another player. Specifically, player Dino-Dan (a recruiting player) has provided the new player with an asset, in this case a Free Spin, for use at any time after the new player has played two spins. The Free Spin provides an incentive for the new player to play the wagering game, and the requirement for playing two spins ensures that the new player wagers at least a minimum amount. The Free Spin can be saved on any storage medium, e.g., ticket, memory card, etc. An optional time and date can also be stored on the storage medium to indicate current or previous assets. In addition to the message indicating the transfer, the main display 14 optionally shows a Free Spin Counter (e.g., "1" spin).

Figure 3B:
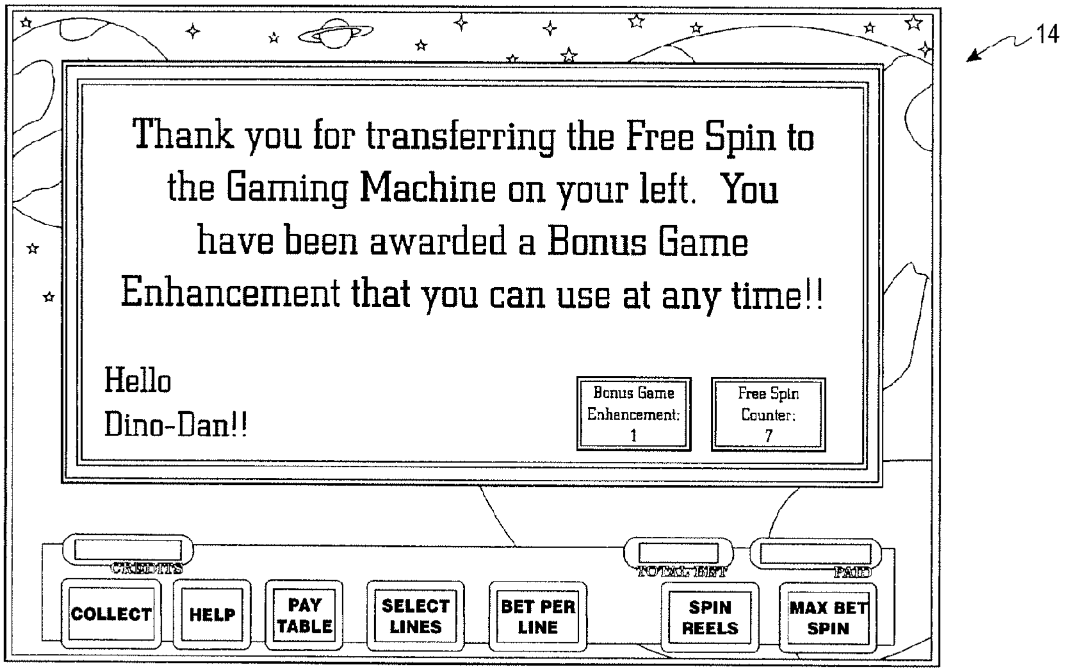
FIG. 3*b* shows the main display of FIG. 3*a* indicating to the recruiting player that a stored game asset has been transferred to the new player and a new game asset has been added to the profile of the recruiting player, according to another embodiment of the present invention.

Referring to FIG. 3*b*, the main display 14 shows a message to the recruiting player, Dino-Dan, confirming the transfer of the Free Spin. In exchange, player Dino-Dan has been awarded a game enhancement parameter, which in this case is a Bonus Game Enhancement, that he or she can use at any time. Thus, the Bonus Game Enhancement provides an incentive for player Dino-Dan to recruit other players. A Bonus Game Enhancement Counter indicates that player Dino-Dan currently has "1" Bonus Game Enhancement. The Bonus Game Enhancement may be a multiplier that is applied to the bonus game when it is achieved, or other features allowing for an increased chance of success or payout in the bonus game.

The recruiting player Dino-Dan can collect the assets over a short, finite period of time (e.g., one hour, or one day) or over an extended period of time (e.g., a year). After the assets have been collected, player Dino-Dan can transfer one or more assets in response to certain events, such as achieving a symbol combination or a random mystery event, or a certain person being the new player at an adjacent gaming machine. For example, player Dino-Dan is allowed to transfer an asset if the new player meets predetermined criteria.

Optionally, the asset (e.g., the Bonus Game Enhancement) transferred to Dino-Dan can be removed if it is not used within a period of time, or if Dino-Dan has not met certain criteria such as wagering an amount over a certain period of time. This encourages continued game play.

Other types of game-enhancement parameters can be awarded to, or selected by, the recruiting player (e.g., Dino Dan). Examples include the "RANDOM MULTIPLIER," "AUTOMATIC NUDGE," "UPGRADE," "DIFFERENT PAY TABLE," "EXTRA WILD," "SCATTER," "RIGHT-TO-LEFT," "RE-SPIN," "MORPH," "HOLD SYMBOL," and "SYMBOL MOVEMENT." Different types of game-enhancement parameters provide the player with the opportunity to achieve a higher payout or make it easier for the player to achieve a payout or other award.

The RANDOM MULTIPLIER game-enhancement parameter multiplies a payout or other outcome awarded to the player. The RANDOM MULTIPLIER game-enhancement parameter may take the form of an electronic pair of dice or a single die spinning on a gaming machine display.

The AUTOMATIC NUDGE game-enhancement parameter is advantageous in situations where a better payout can be achieved by moving symbols on one (or multiple) reels either up or down across a payline.

The UPGRADE game-enhancement parameter causes a winning symbol combination to move up at least one or two winning symbol combinations on the pay table for the gaming machine 10. For example, a lower-paying combination of three "cherry" symbols may pay out as if the player had achieved three "3-bars" symbols, a better combination.

The DIFFERENT PAY TABLE game-enhancement parameter implements a different and higher-paying pay table, awarding larger payouts for various symbol combinations. For example, if a combination of three "cherry" symbols normally pays out 200% of the original wager, the DIFFERENT PAY TABLE game-enhancement parameter may result in a payout of 300% of the original wager for the combination.

The EXTRA WILD game-enhancement parameter causes a symbol that is normally a regular symbol, such as a "cherry" symbol or a "1-bar" symbol, to become a wild symbol.

The SCATTER game-enhancement parameter converts a single-line pay into a scatter payout, such that a winning combination of symbols need not be located all on a single active payline.

The RIGHT-TO-LEFT game-enhancement parameter allows "right-to-left" combinations (i.e., combinations starting on the right-most reel and extending left across the reels) to win, in addition to the standard winning "left-to-right" combinations.

In the event that the player does not achieve a high-paying winning combination, the RE-SPIN game-enhancement parameter re-spins one or more of the reels, giving the player an additional chance to get a high-paying winning combination.

The MORPH game-enhancement parameter allows one or more symbols on the reels to morph into other symbols that are more beneficial.

The HOLD SYMBOL game-enhancement parameter holds a symbol in a certain location on one of the reels so that a final symbol combination across the reels must take into account the held symbol.

The SYMBOL MOVEMENT game-enhancement parameter allows symbols to move to others location along a payline if it would result in a better outcome (e.g., a higher payout).

The game-enhancement parameters discussed above are merely examples of what can be awarded in response to a transfer from the recruiting player, and it should be appreciated that this list is not exhaustive. In practice, additional types of game-enhancement parameters may be employed.

Figure 4A:
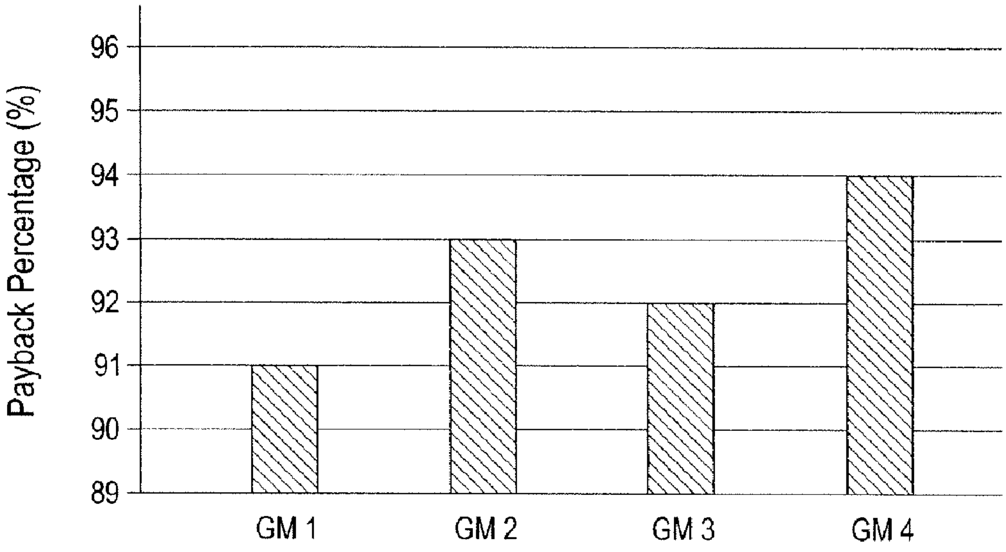
FIG. 4*a* shows a bar graph of payback percentage for a bank of four gaming machines at a first time, according to yet another embodiment of the present invention.
Figure 4B:
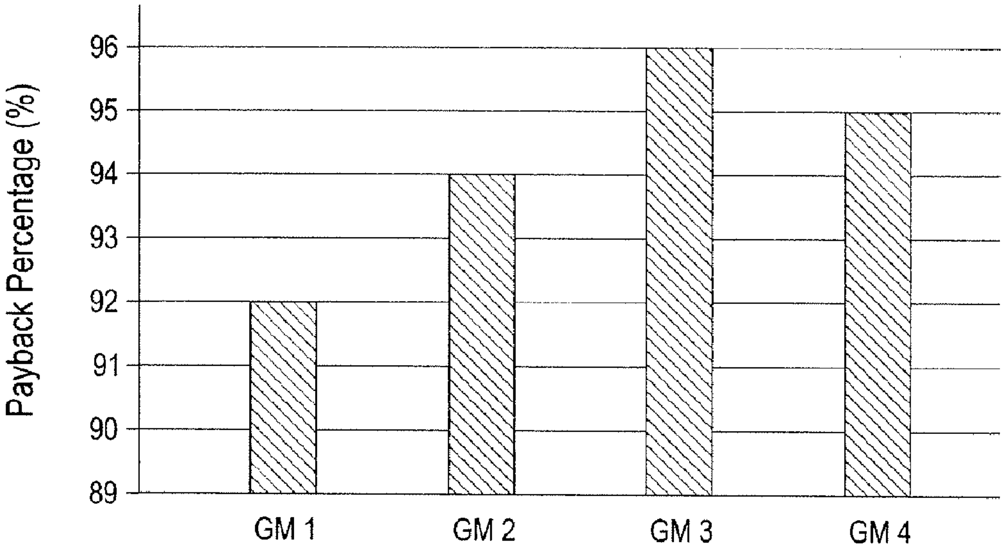
FIG. 4B shows the bar graph of the payback percentage at a second time, after a new player has begun playing at one of the gaming machines.

FIGS. 4*a* and 4*b* illustrate another embodiment in which a player's accumulated assets have an effect on other players. In FIGS. 4*a* and 4*b*, the assets of a player or players have an effect on the payback percentage of the four linked gaming machines (GM1, GM2, GM3, GM4). In this case, the players' accumulated assets result in the player achieving a certain player status, or player level. FIG. 4*a* is a graph illustrating the payback percentage at each gaming machine in a bank at an initial time. The payback percentage of each gaming machine is based on at least two criteria: (i) the player level of a respective player playing the gaming machine; and (ii) the player level of other players playing any of the other three linked gaming machines. Accordingly, the payback percentage of each gaming machine is dependent not only on the player level of the corresponding player but also on the player level of the other players on the bank of gaming machines. For example, the payback percentage at gaming machine 1 (GM1) is dependent on both the player level of the current player playing GM1 and the player level of each of the three players playing at gaming machine 2 (GM2), gaming machine 3 (GM3), and gaming machine 4 (GM4). As shown, the payback percentage at gaming machines 1-4 (GM1-GM4) is 91%, 93%, 92%, and 94%, respectively.

The player level is based on criteria occurring at corresponding gaming machines. For example, the criteria can be the receiving of a certain combination of symbols in the wagering game or the achieving of a certain event. The criteria can also be based on a function of the wager inputs from the player. For example, an increased wager input rate over a period of time or number of plays may result in a higher player level. Player levels can also be a function of winnings, elapsed time from last wager, number of wagering sessions, and number of wagering games. In summary, player levels can fluctuate during the game such that the payback percentage at each gaming machine fluctuates as well.

Referring to FIG. 4*b*, the graph of FIG. 4*a* now illustrates the payback percentage at the bank of four gaming machines at a subsequent time. The initial player playing GM3 has left and a new player has joined the bank of gaming machines. Because the new player has a higher player level than the initial player, the payback percentage at each gaming machine is increased. For example, the payback percentage at each of GM1, GM2, and GM4 has increased by 1% (i.e., 92%, 94%, and 95%, respectively). Thus, the players of GM1, GM2, and GM4 have benefited from having the new player with a higher player level (i.e., higher or more assets) join the bank. Had the new player had a lower player level than the initial player, the players of GM1, GM2, and GM4 would have had a decreased payback percentage.

The payback percentage is optionally displayed in real time on one or more displays of the gaming machines GM1, GM2, GM3, and GM4. For example, the players may have a feeling of excitement when the graph (or other form of communicating the payback percentage) moves upward as player levels increase or a "high-roller" player begins play at one of the gaming machines GM1, GM2, GM3, and GM4, increasing the payback percentage at each gaming machine.

Figure 5:
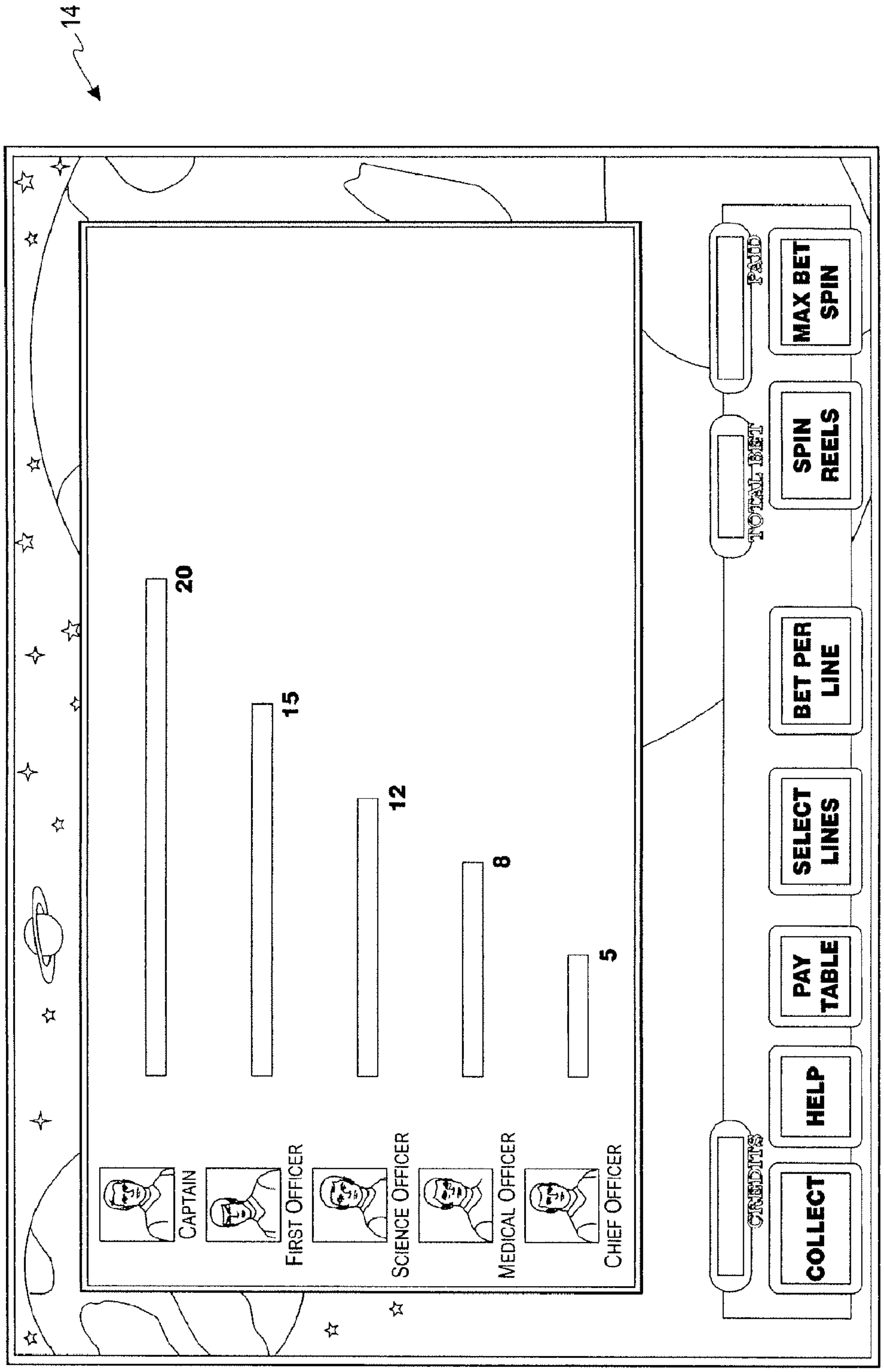
FIG. 5 illustrates a help screen on a main display of the gaming machine of FIG. 1 that indicates a series of possible game savable assets that are needed to achieve various levels in accordance with a Star-Trek™ themed gaming machine, according to yet another embodiment of the present invention.

FIGS. 5-13 illustrate other embodiments where the assets of a player may have an effect on the game play at other gaming machines. FIGS. 5-13 will be described with respect to a Star Trek™ theme. In FIG. 5, a help screen on the main display 14 indicates the number of savable assets that are needed to achieve various player levels that are indicated by characters in a Star-Trek™ themed wagering game. As discussed above, the assets that result in the various player levels can be based on the player receiving a predetermined combination of symbols, achieving a certain event, or having a certain wager-input rate.

The player generally begins with no assets and attempts to work himself or herself up to a first level (Chief Officer) with the hope of increasing to the highest available level (Captain). For each level the player accumulates a predetermined number of assets. As shown, the requirement for the Chief Officer level is five assets and the requirement for the Captain level is twenty assets. As the player level increases, additional options become available to the player and to other players in the bank as discussed in more detail below.

Figure 6:
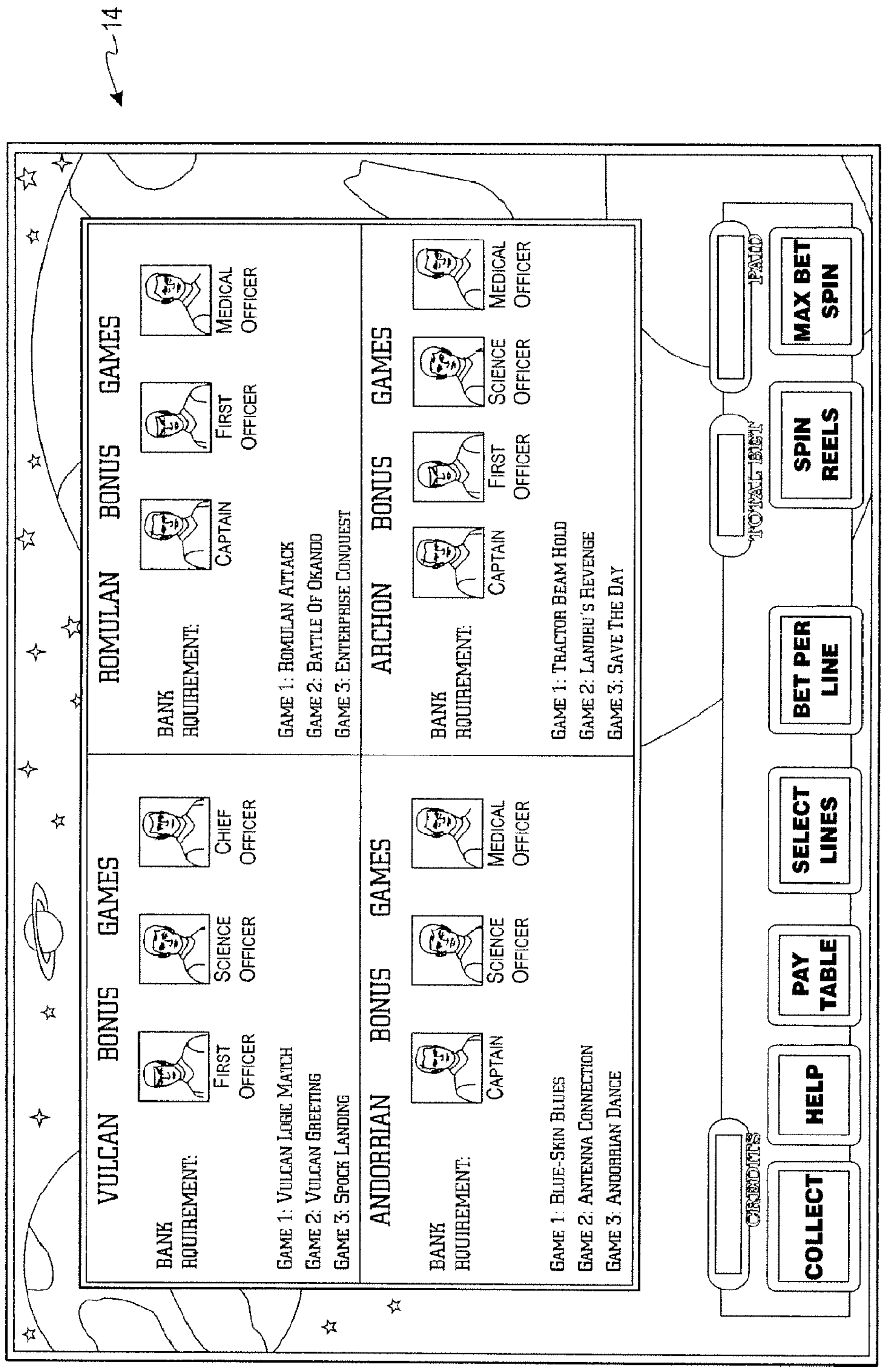
FIG. 6 illustrates a help screen on a main display of the gaming machine of FIG. 1 that indicates a series of bonus games with Star-Trek™ themes that are accessible on a bank of gaming machines based on the level of players who are playing at the bank of gaming machines, according to yet another embodiment of the present invention.

Referring to FIG. 6, a help screen on the main display 14 indicates a series of community bonus games that are accessible on the bank of gaming machines based on the level of players who are playing at the bank of gaming machines. For example, the exemplary bonus games are separated into four sets of community bonus games: Vulcan Bonus Games, Romulan Bonus Games, Andorrian Bonus Games, and Archon Bonus Games. Each set of bonus games includes three games, e.g., the Vulcan Bonus Games includes three games (Vulcan Logic Match, Vulcan Greeting, and Spock Landing).

To play a specific set of community bonus games, a conditional state related to the player levels is required at the bank of gaming machines. For example, when considering the player levels of FIG. 5, the bank requirement for playing the Vulcan Bonus Games in FIG. 6 is to have at least one player having a First Officer level, at least one player having a Science Officer level, and at least one player having a Chief Officer level. Optionally, players of higher levels qualify for lower level requirements. For example, referring to FIG. 5, a player having a Captain level meets the requirement necessary for a First Officer level.

Figure 7:
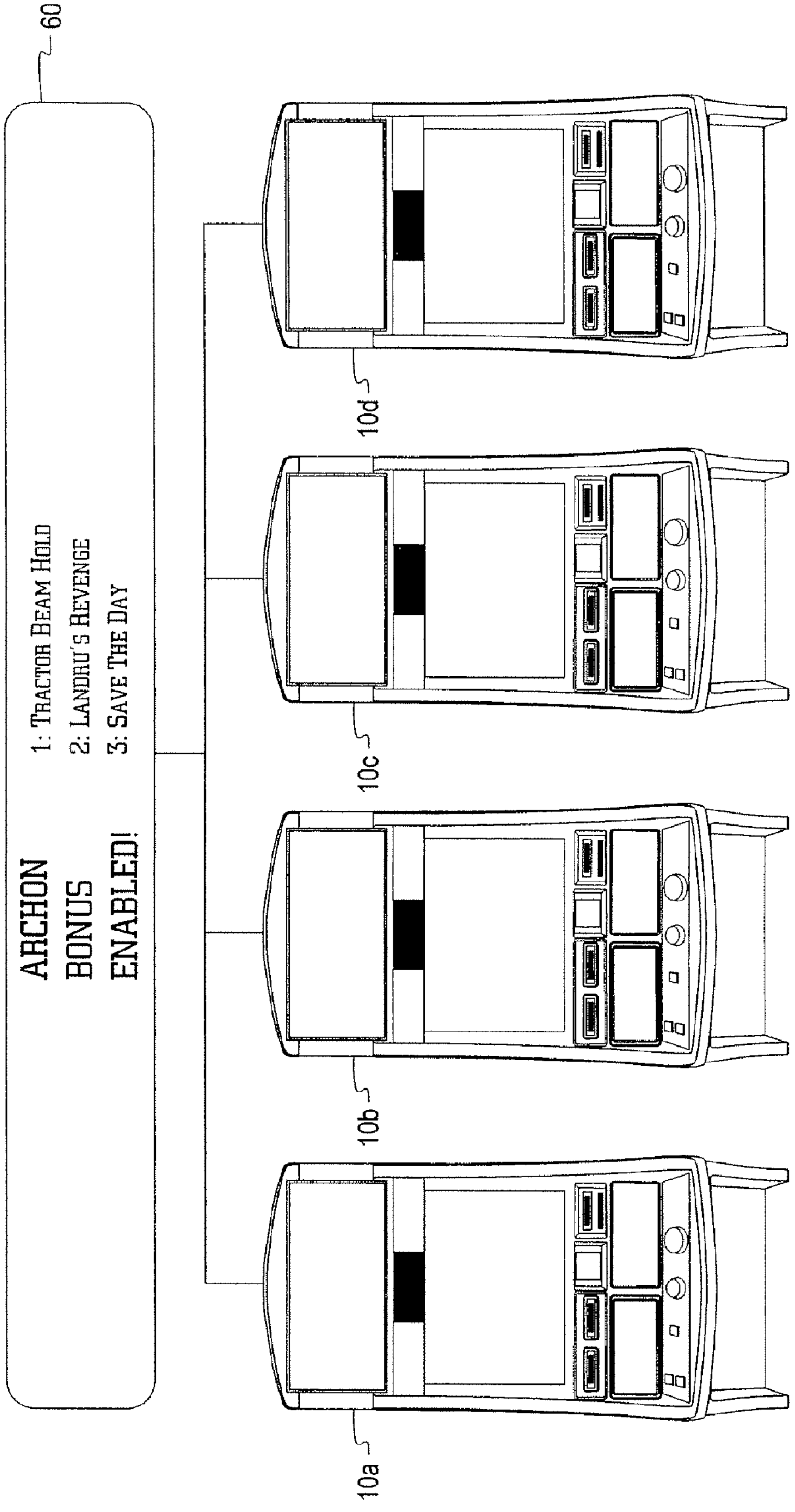
FIG. 7 illustrates a bank display for a bank of machines, indicating the bonus games that are available based on the conditional state of the players at the bank of gaming machines, according to yet another embodiment of the present invention.

Referring to FIG. 7, a bank of gaming machines 10*a*-10*d* is coupled to a bank display 60, which indicates community bonus games that are available to the players. In the example in FIG. 7, the Archon Bonus (see FIG. 6) has been enabled and the bank players may play one of the Tractor Beam Hold game, the Landru's Revenge game, and the Save the Day game. The community bonus games are enabled in response to a conditional state at the bank of gaming machines 10*a*-10*d*, wherein the conditional state is a function of player levels specified in FIGS. 5-6. For example, the Archon Bonus community bonus games depicted in FIG. 6 are enabled because there are four players playing on the bank that meet the minimum player level requirements of Captain, First Office, Science Officer, and Medical Officer.

As such, in response to a community-game triggering event (e.g., a certain symbol combination at one of the gaming machines, or a random "mystery" trigger independent of the outcomes at the gaming machines), the four players at the gaming machines are eligible to play one or more of the Archon Bonus community bonus games. Eligibility to participate in the community game can be determined using a few methods. In one method, the eligibility is provided to all players within a finite group of machines (e.g., a bank of four, five, or six machines) if any of the players on those machines meets a certain criteria to be eligible for the community event. Thus, while it may be that the levels of only three players met the criteria for creating eligibility for a certain community game event, when the community event is triggered, all players in the group will participate in the community event. Or, it may be that three players who met the criteria for making a certain community game event eligible for the machine, and the one player who triggered the community event will participate in the community event, leaving a few players out of the community event.

It should be noted that the players can continue to accumulate assets while playing the Archon community bonus games, leading to higher player levels and, possibly, eligibility to other games. Further, the player levels could decrease, removing eligibility to the Archon community bonus games. If the player leaves, the player's level can be stored to a storage medium for game play during subsequent wagering sessions (i.e., after the player has cashed out during a first wagering session and has returned for a second wagering session). In this way, a player with a certain level may seek out a bank of machines where his or her player level will "mesh" well with the levels of the players at the new bank to produce eligibility to a group of games the player finds desirable.

In a further embodiment, the player can change and/or customize a game theme associated with the bonus games (also referred to as community-game events) played on the bank of gaming machines 10*a*-10*d*. The changes may correspond to the theme of the player's level achieved. For example, if the player achieves the Medical Officer level, the basic wagering game can include symbols related to medicine. The underlying game may be the same, but the symbols used to indicate game outcomes may change, as well as the background symbols and art.

Figure 8:
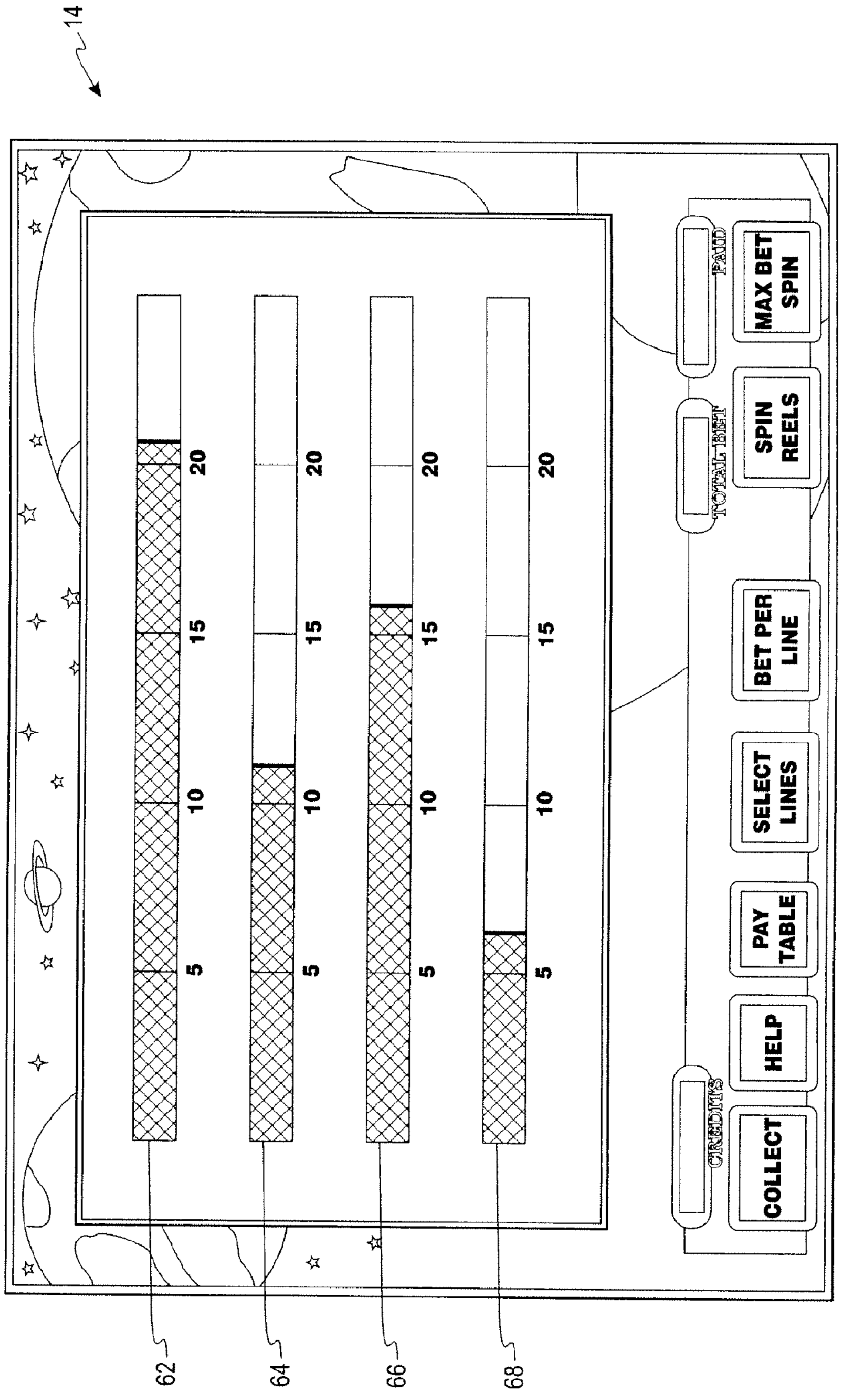
FIG. 8 illustrates a main display of the gaming machine of FIG. 1 in which the conditional state of the player is displayed to the player and the conditional state is a function of the player's wager input rate, according to yet another embodiment of the present invention.

Referring to FIG. 8, the main display 14 illustrates the conditional state of a player's level fluctuating with respect to time, providing a player with a history of his or her player level. As a player plays a wagering game on a bank of gaming machines, the player's level may fluctuate based on certain criteria that occurs at the corresponding gaming machine. For example, the player's level may fluctuate based on criteria described above in reference to FIG. 4*b*.

The player level is illustrated with four bars, a first bar 62, a second bar 64, a third bar 66, and a fourth bar 68, each bar indicating increments of "5" units (e.g., assets, credits, etc.). Further, each bar represents a specific period of time. Assuming that the player level is based on wager input rate and is measured in assets, the first bar 62 indicates that the player's wager input rate provides twenty-one (21) assets during a first time period. During a second time period, as indicated by the second bar 64, the wager input rate of the player has decreased and, accordingly, the player level has decreased to about twelve (12) assets. During a third period of time the wager input rate of the player has increased slightly to provide about sixteen (16) assets, shown in the third bar 66, and during a fourth period of time the wager input rate has decreased to provide about seven (7) assets, shown in the fourth bar 66. Thus, referring to the player levels illustrated in FIG. 5, over the course of four periods of time the player level has changed from Captain ("20" asset requirement), to Science Officer ("12" asset requirement), to First Officer ("15" asset requirement), and, lastly, to Chief Officer ("5" asset requirement). The skilled artisan would contemplate several ways of illustrating the player level over a period of time.

Alternatively, the four bars 62-68 in FIG. 8 show the player level for each player of four gaming machines. For example, the first bar 62 indicates that the player level of a player at a first gaming machine has about twenty-one (21) assets, the second bar 64 indicates that the player level of a player at a second gaming machine has about twelve (12) assets, and so on. In summary, FIG. 8 illustrate that displaying a player's level or a group of players' levels provides helpful information to the player or players.

Figure 11:
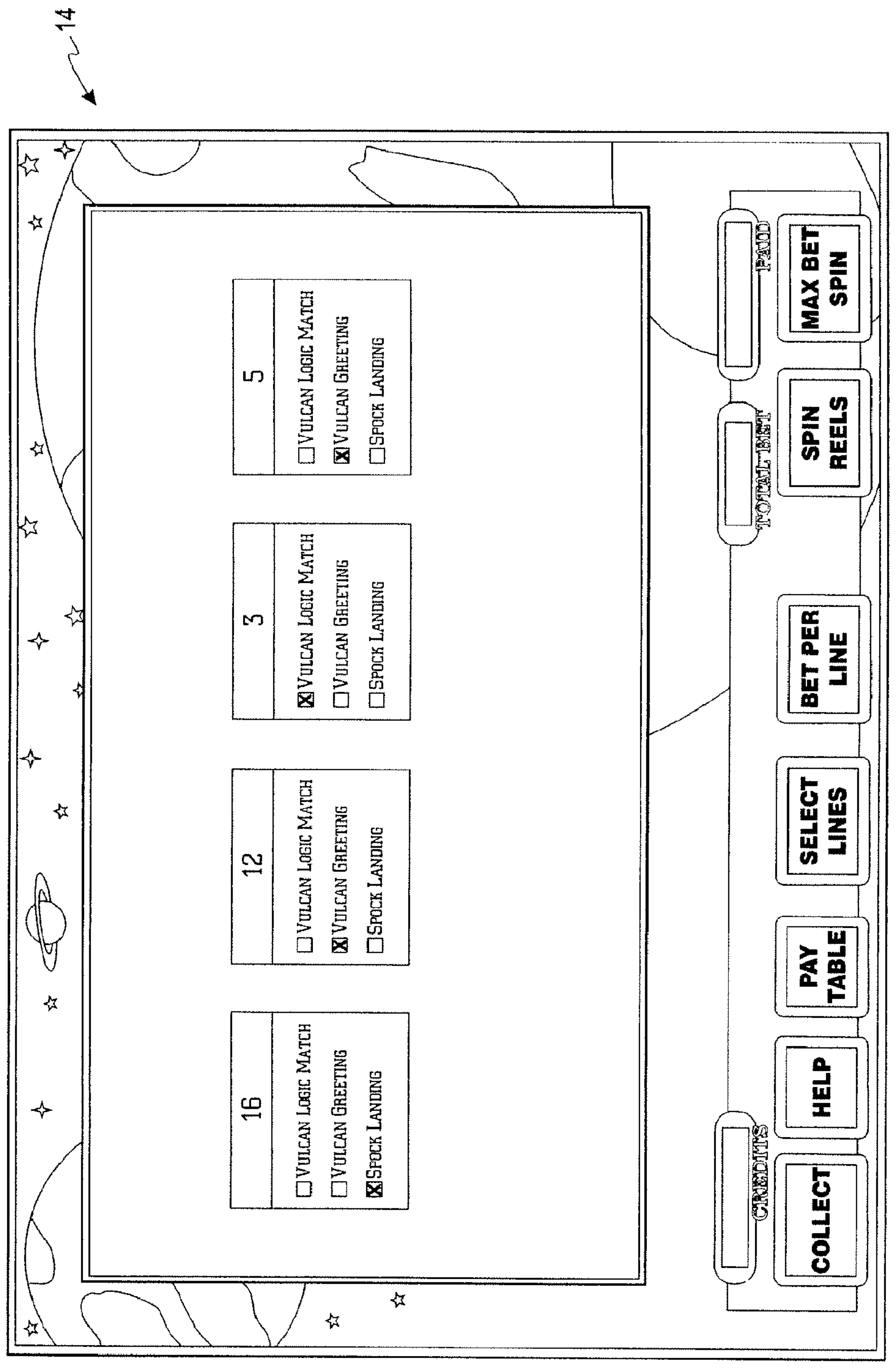
FIG. 11 schematically illustrates a weighted system for selecting one of the bonus games from FIG. 6, according to yet another embodiment of the present invention.

Based on the current player level of each player, the players may select a community-game event using a weighted average of the player levels as explained in more detail in reference to FIG. 11. Alternatively, the player with the highest ranked player level is allowed to select the community-game event.

The fluctuations in player level can be displayed individually to the player in real time. Alternatively, a weighted average of the player levels of all the players on the bank of gaming machines is displayed. Thus, when a higher ranked player joins the bank everyone will tend to get more excited because the weighted average of the player levels will increase, opening new opportunities for all the players (e.g., enabling previously unavailable bonus games).

Optionally, a player is warned before his or her player level is decreased. For example, a message may notify the player that unless he or she performs a certain action the player level will be decreased. The player may make a selection, increase the player level, achieve a certain outcome, or pay a fee to prevent the decrease in the player level.

Figure 9:
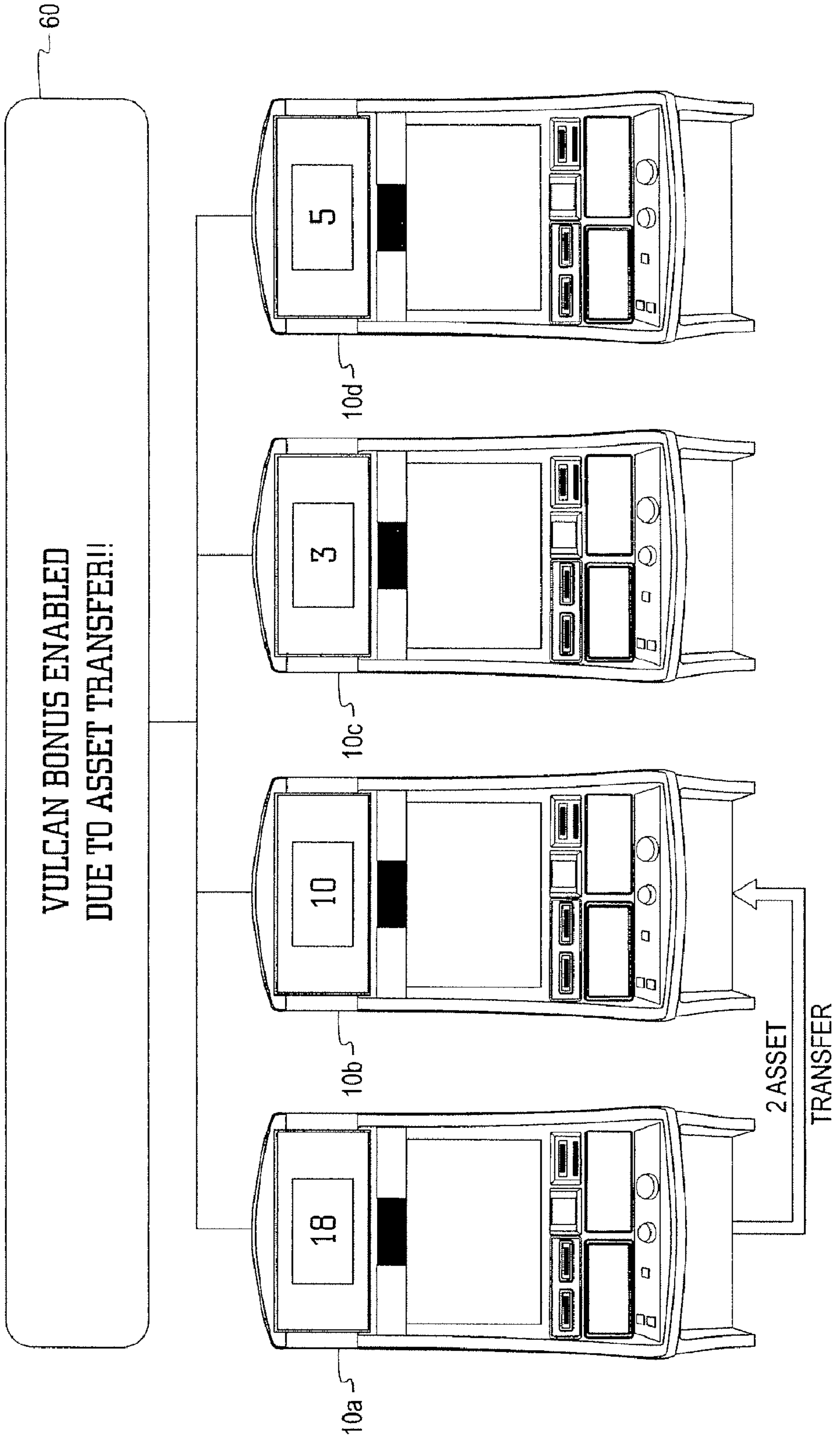
FIG. 9 illustrates a main display on a first gaming machine transferring assets to a player on a second gaming machine to cause the level of the second player to increase, providing accessibility to a new bonus game or a new set of bonus games, according to yet another embodiment of the present invention.

FIG. 9 illustrates an additional embodiment in which assets are transferred between players to achieve a certain player level for the bank of gaming machines, thereby achieving a positive result for the entire group. Specifically, in FIG. 9, the bank display 60 of the bank of gaming machines 10*a*-10*d* indicates that assets have been transferred between two players. In the illustrated scenario, the first player has eighteen (18) accumulated assets, the second player has ten (10) accumulated assets, the third player (on the third gaming machine 10*c*) has three (3) assets, and the fourth player (on the fourth gaming machine 10*d*) has five (5) assets. To enable the Vulcan Bonus games, the players must meet the requirements of having at least a First Officer level of "15" assets, a Science Officer level of "12" assets, and a Chief Officer level of "5" assets.

The first player meets the First Officer level, wherein "18" assets are greater than the required "15" assets. The fourth player meets the Chief Officer level, wherein "5" assets is the minimum required for this level. The only requirement that is not met by the players is the Science Officer level. To meet this requirement, the first player transfers "2" assets to the second player to obtain the level of Science Officer. After the transfer, the first player has the rank of First Officer ("18"−"2"="16" assets), the second player has a modified level—the rank of Science Officer ("10"+"2"="12" assets), and the fourth player has the rank of Chief Officer. Accordingly, based on the transfer of assets, the players are allowed to play the Vulcan Bonus games.

In alternative embodiments, the transfer of assets is permitted only if a community-event triggering event occurs. For example, the second player may be required to achieve a predetermined outcome before he or she is allowed to receive the "2" assets. Optionally, the transferring player (e.g., the first player) may receive an award for transferring the assets to the receiving player (e.g., the second player), as discussed with reference to FIG. 3.

Information associated with the players can be displayed on any display of the gaming machines 10*a*-10*d* or the bank display 60. For example, the players' names, levels, and gaming machines can be displayed individually or collectively. In other words, each player may be able to view his or her own individual data or data associated with any other player on the bank. Thus, if the first player is aware that the second player needs two assets for the group of players to access the Vulcan Bonus games, the first player may send the assets to the second player before the second player requests them. Each player is encouraged to improve the game-play of the entire group of players on the bank of gaming machines 10*a*-10*d*. The information can be displayed locally on each gaming machine and/or on the bank display 60.

The bank of gaming machines 10*a*-10*d* may, alternatively, suggest to the players which bonus games have not been played and how to enable those games. Thus, the players may receive automatic messages notifying them which assets may be transferred to enable specific bonus games. As such, the community game event would rely on the system to determine which players have played which community events (e.g., via use of player tracking cards), allowing for the automatic messages to be played. Further, the system operating the community event may provide statistics to show which community events have been played by percentage, to allow players to understand that an asset transfer may provide access to a very rare community event if the community event trigger is achieved.

If the minimum requirements are met for playing one or more community games, one or more of the players may be given the option to select a specific bonus game. For example, the player with the highest rank level (e.g., the first player) may be allowed to make the decision as to what bonus game should be played. Alternatively, the decision may be made by all the players on the bank using a weighted system (described in more detail below in reference to FIG. 11).

Figure 10:
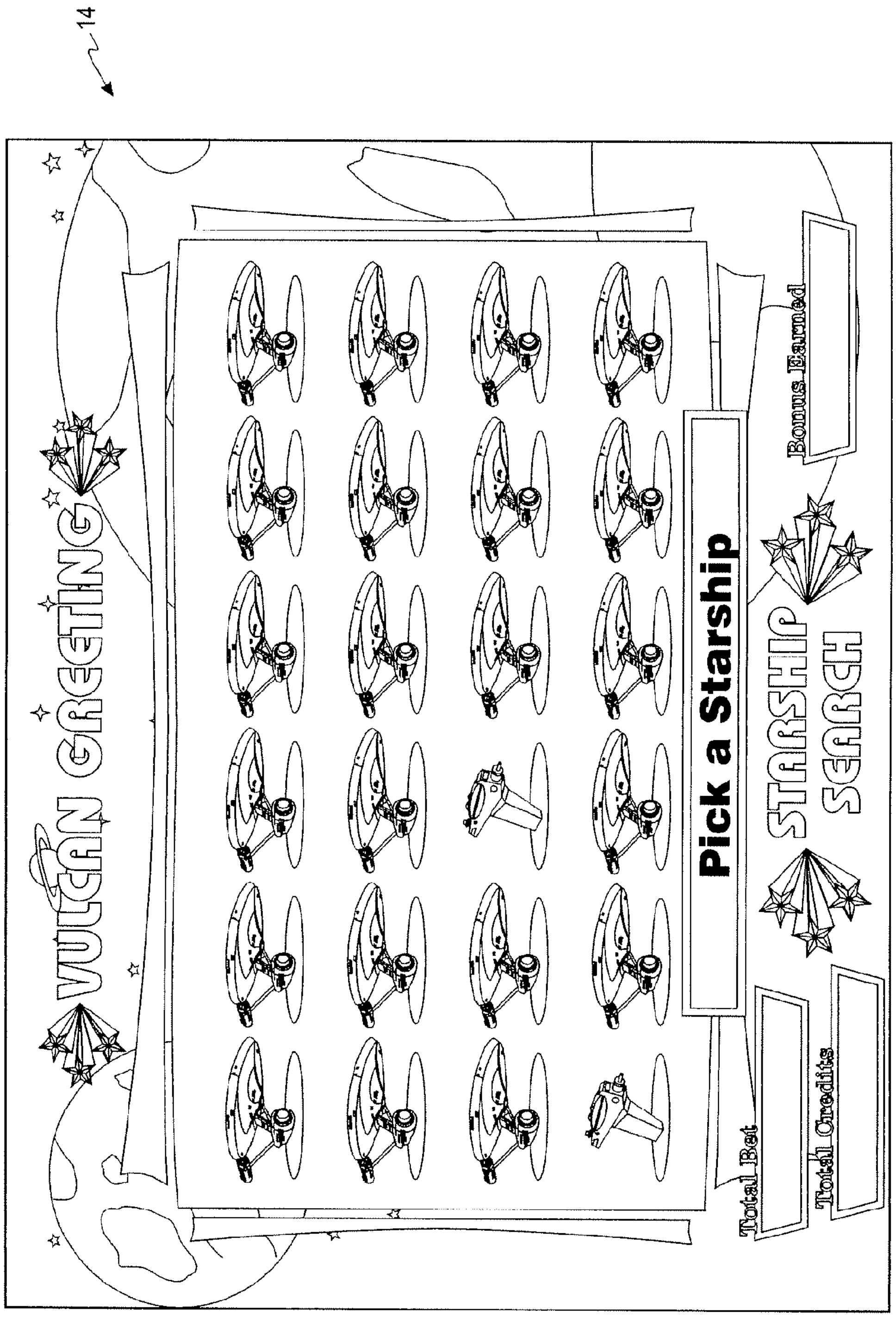
FIG. 10 illustrates the bonus game that has been selected from the possible bonus games listed in FIG. 6, according to yet another embodiment of the present invention.

FIG. 10 illustrates one type of community event that includes several players taking turns with picks to achieve a "match." The Vulcan Greeting game (which is Game #2 of the Vulcan Bonus games of FIG. 6) has been selected by the player, players or the computer after a community-event trigger has been achieved by one or more of the players while the Vulcan Bonus Games are enabled. The Vulcan Greeting is typically displayed to the players on the bank of gaming machines 10*a*-10*d* via the community display 60. Here, the players are shown a plurality of selectable symbols which, after selection, reveal a symbol. Because two like symbols ("Phaser Guns") have been found, the eligible players will be provided with at least one award.

Referring to FIG. 11, the main display 14 shows a weighted system in which the players select the community bonus games referred to in FIG. 6. Each player on the bank selects one of the games from the list of Vulcan Bonus games, which are enabled. The first player (having "16" assets) selects the Spock Landing game, the second player (having "12" assets) selects the Vulcan Greeting game, the third player (having "3" assets) selects the Vulcan Logic Match game, and the fourth player (having "5" assets) selects the Vulcan Greeting game. The game selected by players having the greatest number of total combined assets is played. Thus, in the example of FIG. 11, the Vulcan Greeting game is played because it is selected by two players whose total combined assets are "17" ("12"+"5"). Although the first player has the greatest number of assets, his or her number of "16" assets is lower than the total combined assets of the second player and the third player. The player selection regarding which community bonus game to play may be conducted after the triggering of the community event by one or more of the players, or before the triggering occurs.

In alternative embodiments, the player with the highest number of assets decides which game to play on the bank. In the above the example of FIG. 11, if this rule was used, the first player would make the decision to play the Spock Landing game because he or she has "16" assets.

Figure 12:
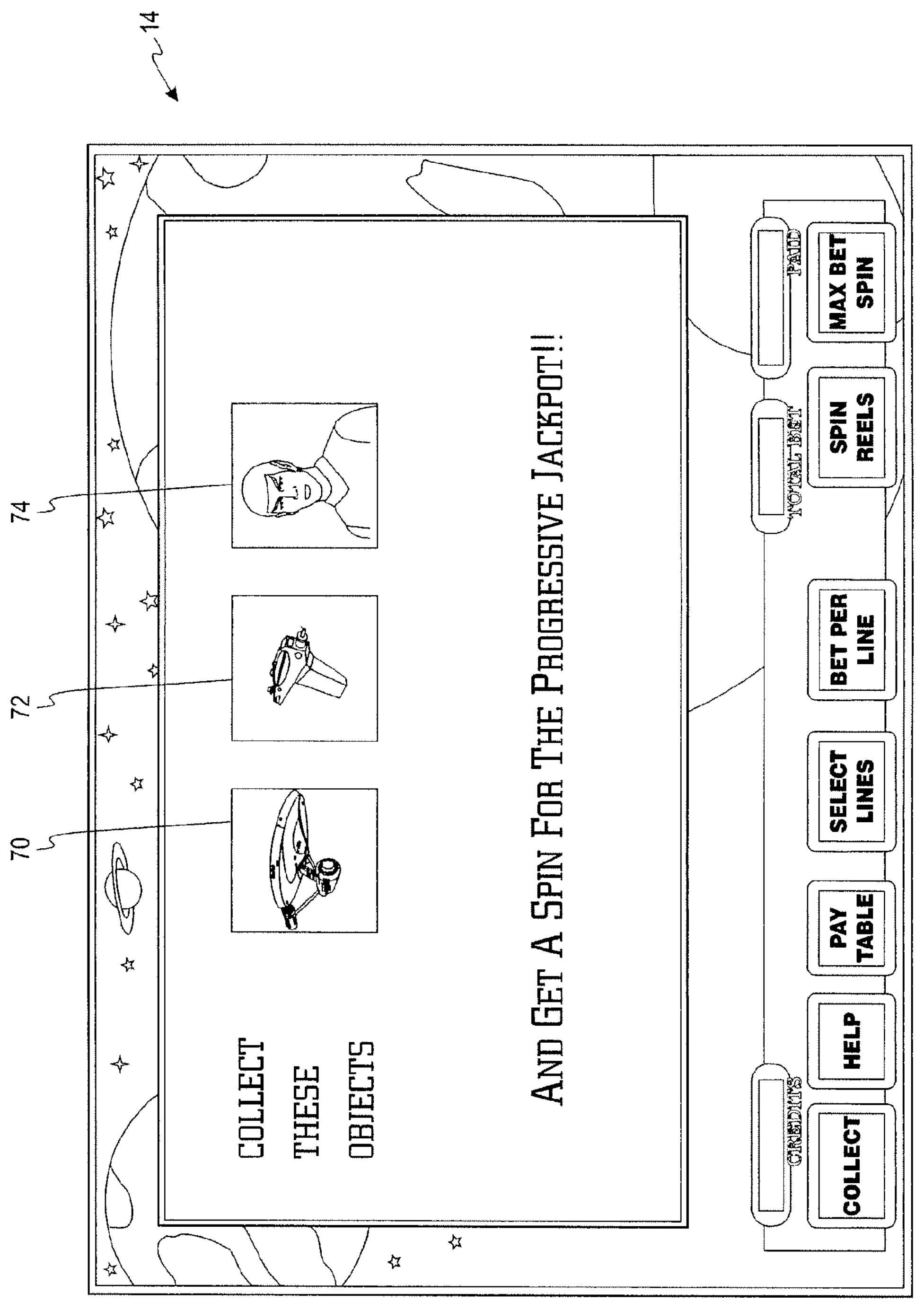
FIG. 12 illustrates a main display of the gaming machine of FIG. 1 showing the assets that must be collected to access bonus games or unlock other game enhancement parameters, according to yet another embodiment of the present invention.

FIG. 12 is an alternative embodiment whereby a collection of different assets is required for an award, or eligibility to achieve an award. Referring to FIG. 12, the main display 14 includes a list of assets that must be collected to access bonus games, community bonus games, or to unlock other game enhancement parameters. The list of assets includes a Starship asset 70, a Phaser Gun asset 72, and a Spock asset 74. If a player collects all three assets he or she receives a free spin for playing a progressive game.

With respect to community events, a certain community event may be triggered when a predetermined number of players have achieved all three assets. Thus, players may collect more than one of a certain asset, and use that to trade other players for a different asset. Thus, the chances of the entire group achieving the community event are increased via the asset transfers.

Figure 13:
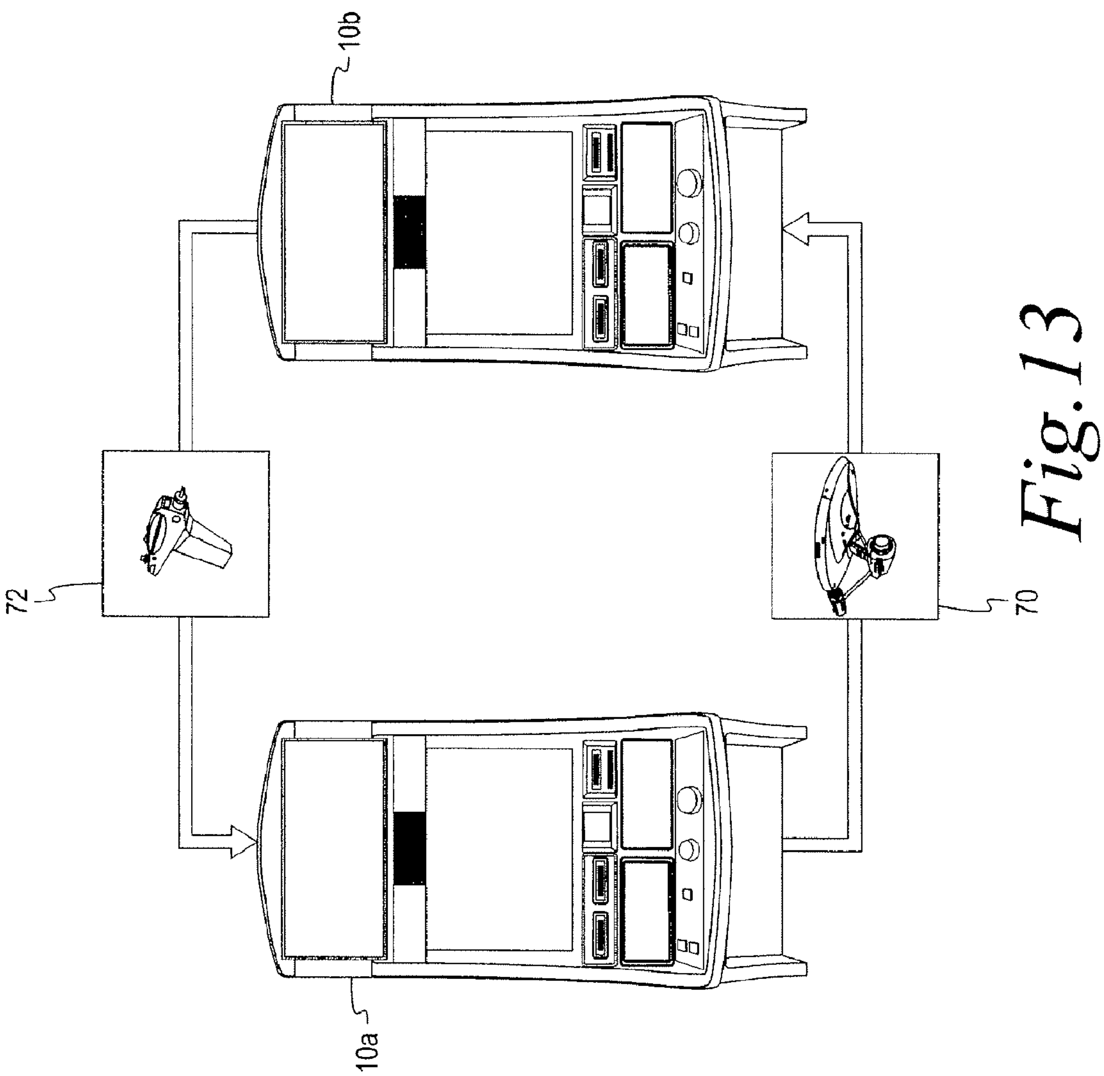
FIG. 13 illustrates a first player at a first gaming machine within a bank of gaming machines trading assets with a second player at a second gaming machine, according to yet another embodiment of the present invention.

For example, FIG. 13 illustrates a trade of assets between players on the bank of gaming machines 10*a*-10*b*. As players on the bank collect various assets, they will realize they are missing one or more items to enable certain community bonus games or unlock certain game enhancement parameters. In addition, a player may collect two or more identical assets, such as two Starship assets 70.

A trade of assets between players helps one or more players to achieve a desired goal. For example, it is assumed that the first player has a collection of assets that includes two Starship assets 70 and a Spock asset 74, and that the second player has a collection of assets that includes two Gun assets 72 and a Spock asset 74. If the first player trades one of its Starship assets 70 for one of the second player's Gun assets 72, both the first player and the second player will have a full collection of assets for playing a free spin of the progressive game.

The players can trade additional assets during the transfer. For example, assuming that the Gun asset 72 is more valuable than the Starship asset 70, the second player may request the Spock asset 74 in addition to the Starship asset 70 for the Gun asset 72. Optionally, the players that trade assets receive a special award to encourage future transfers. The transfers may occur at any time or only when specific events occur. For example, the players may only be able to transfer assets if an asset-transfer triggering event occurs during the game.

Other ways of trading assets can be made available to the players. For example, a player may charge a fee for a particular asset (e.g., the second player may ask for ten credits in return for the Gun asset 72). In another example, the players can auction assets to other players such that the highest bidder obtains the auctioned asset. The bidders may be able to bid other assets, credits, etc.

Figure 14:
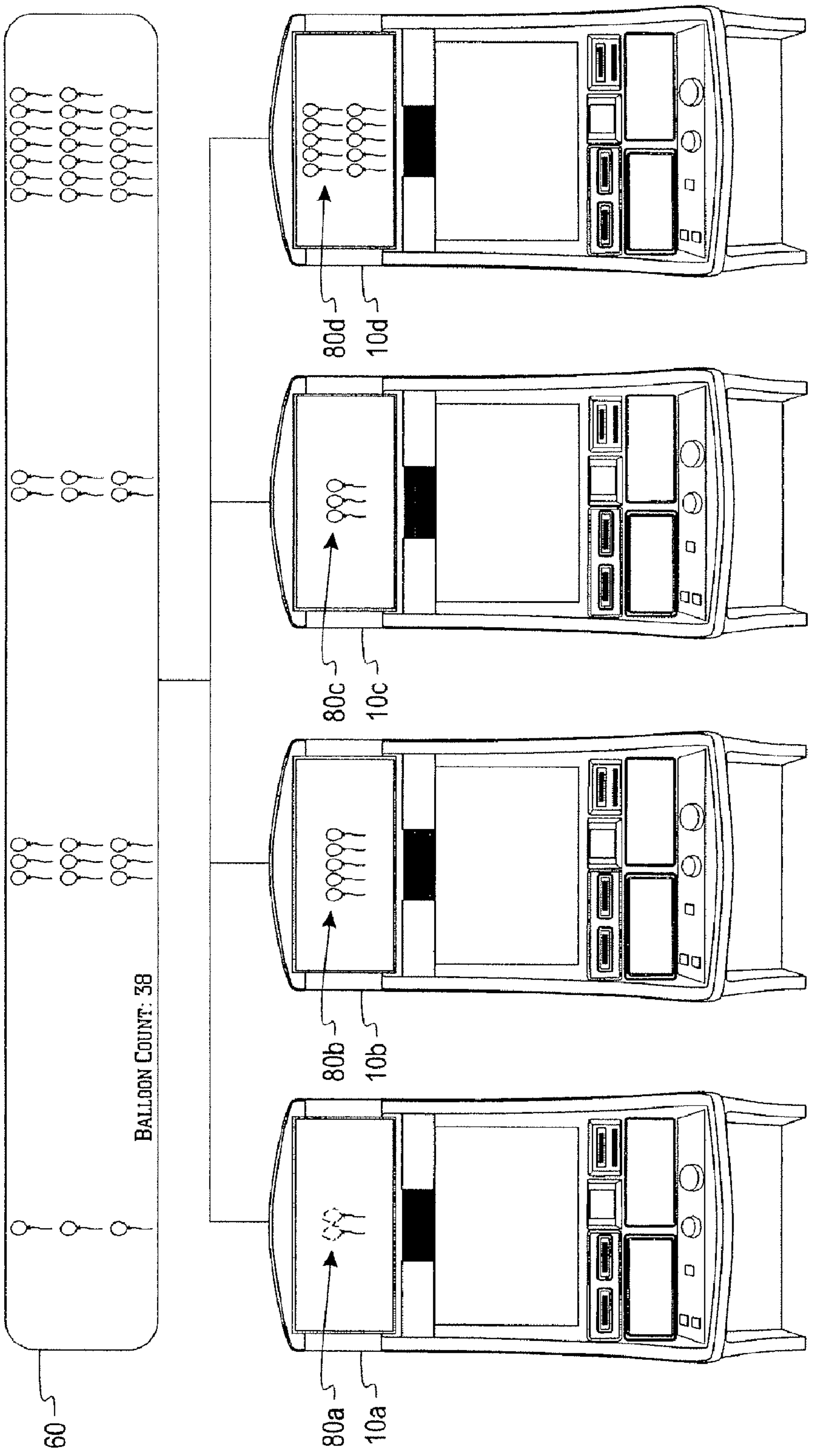
FIG. 14 illustrates a balloon-themed game in which players collect and release balloons into a community bank display, resulting in a possible bonus for each of the players in the bank, according to yet another embodiment of the present invention.

Referring to FIG. 14, the bank of gaming machines 10*a*-10*d* shows a balloon-themed game in which players collect and release balloons into the community bank display 60. As the players collect balloons (which represent collected assets), they may have the opportunity to release them into the bank display 60 to possibly receive a bonus. If the cumulative value of released balloons meets a predetermined number, e.g., forty balloons, the players share a community bonus. Thus, each player has an incentive to collect and release as many balloons as possible. Further, each player is hoping that the other players are collecting and releasing as many balloons as possible. The collection of balloons may be a function of a "collect balloons" symbol combination achieved on the wagering game. The release of balloons may be a function of a certain "release" symbol combination achieved on the wagering game.

As shown, the players have released collectively thirty-eight balloons. The balloons released by each player float in the bank display 60 generally in an area proximate the general area of the corresponding gaming machine. If the players collectively release two more balloons they will share the community bonus. As such, since the players each have at least two collected balloons 80*a*, 80*b*, 80*c*, 80*d* at their respective gaming machines 10*a*, 10*b*, 10*c*, 10*d* that can be released, if any of them achieve a "release" outcome, at least forty balloons will be located in the bank display 60, achieving a community event outcome for the entire bank of machines.

A player with lots of assets, such as the fourth player at the fourth gaming machine 10*d*, may be a "hot" player since he or she is able to collect and release more balloons than other players. Thus, the players on the bank are always more excited when a "hot" player joins the game. The new player's assets are added to the cumulative value of assets displayed in the bank display 60.

The wagering game may also have an unfavorable outcome, resulting in a loss of the assets by a player. For example, an unfavorable outcome has been selected for the first player, as indicated by the exploding balloons in the first gaming machine 10*a*. Consequently, the first player loses the two collected balloons, which have not been released yet. Thus, one unfavorable outcome achieved by the first player may affect only the first player, but not the community of assets.

Figure 15:
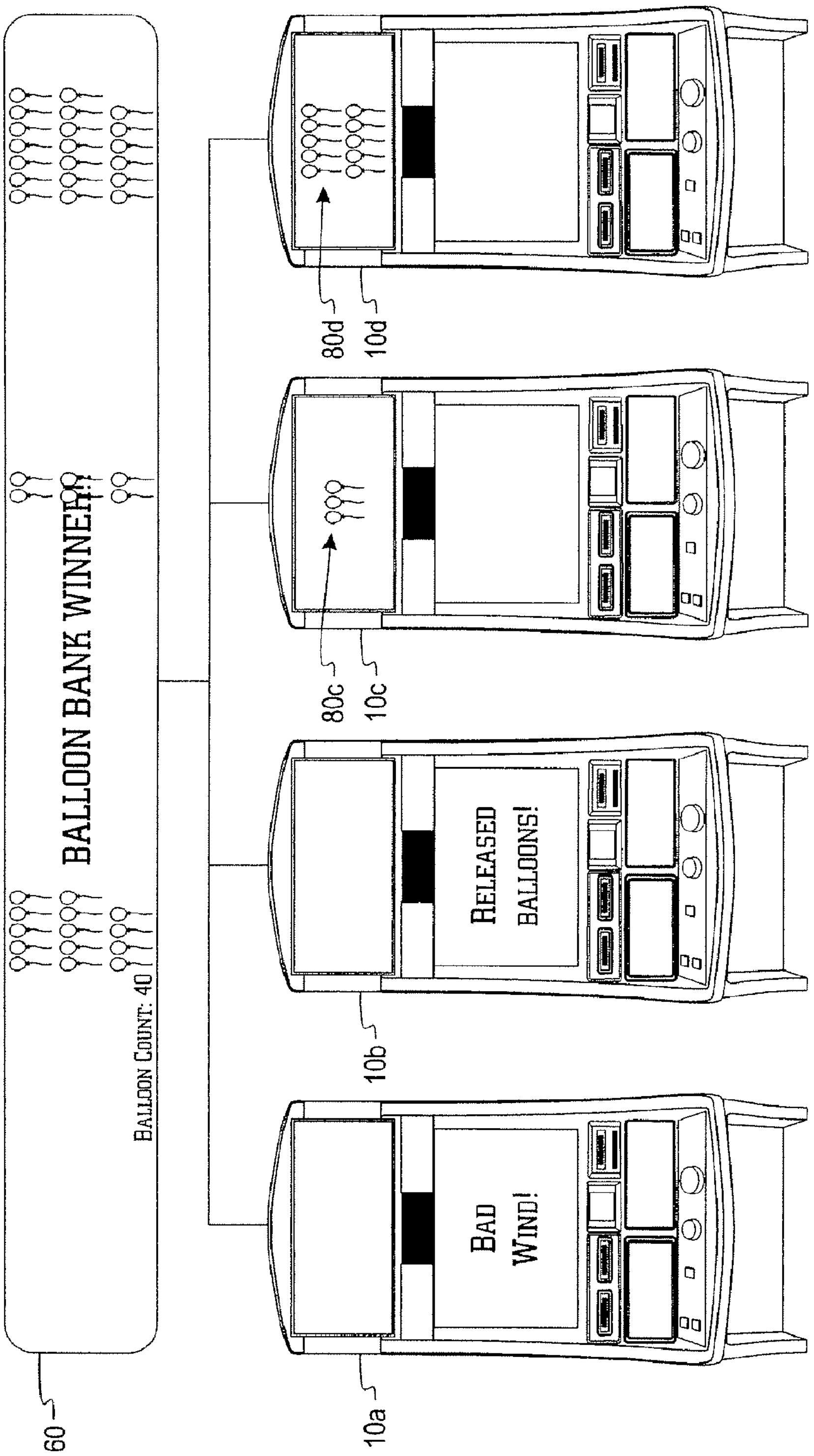
FIG. 15 illustrates a random outcome in one of the gaming machines in the bank of gaming machines that affects the balloons in the community display of FIG. 14, according to yet another embodiment of the present invention.

FIG. 15 shows other possible outcomes affecting the community of assets. First, the first player has received another unfavorable outcome ("Bad Wind"), causing the three balloons that the player has contributed to the community of assets to "blow" out of the bank display 60. And second, the second player at machine 10*b* has received a "release" outcome, which releases the collected five balloons to the bank display 60.

The unfavorable outcome resulted in reducing the cumulative value of balloons from thirty-eight to thirty-five, wherein three balloons have "blown away" due to the bad wind. Nevertheless, the bonus requirement of forty balloons is achieved because five additional balloons have been released by the second player due to the release outcome. If the forty balloons results in a community payout, the community payout is distributed equally among the four players or based on each of the four player's contribution.

All of the collected assets described thus far can be stored in a memory device at a location associated with the player. Alternatively, the assets can be stored on tickets or smart cards carried by the player. These assets can be used by the player at a later gaming session, if desired. Thus, the assets (e.g., Star Trek player level, balloons, etc.) can be accumulated while the player is attempting to assist a first group of players, but saved for a later time, and used with respect to a second group of players to achieve a community event.

In alternative embodiments, a player can use a telephone to access and use one or more of the player's accumulated game assets to attempt to assist a group of players to achieve a community event. For example, using a mobile phone, the player can dial a toll-free phone number to access his or her game assets. A central server associated with the network 50 (FIG. 2) can recognize the player's mobile number for identification purposes, via a caller-id feature, or, alternatively, the central server may require the player to create a unique code number (if, for example, the player uses a caller-id block feature). Optionally, the player may be required to enter an additional code for identifying a specific gaming machine 10.

Thus, the player can use his or her mobile phone to remotely access the wagering game and utilize the accumulated assets at a time and place according to the player's desire. For example, the player can restart a gaming session via the mobile phone at a point where he or she had previously stopped the session, or the player can choose, via the mobile phone, to play an accumulated bonus game that he or she had previously won, but not played.

In another example, the player can put money into a gaming machine 10 while the player is physically at the gaming machine 10. Before the player walks away from the gaming machine 10, the player can register the gaming machine 10 to the player's phone. The player can also let the gaming machine 10 know what assets it may intend to use in the future via remote access by the phone. For example, the player can register the phone number as a password required to access the player's assets on the gaming machine 10. The player can initiate an auto-play feature while at the gaming machine 10 or remotely via the phone. The auto-play feature of the gaming machine 10 is configured to report, e.g., via still or moving images on the phone, one or more of the gaming outcomes. Then, at a later time, the player returns to the gaming machine 10, re-checks into the gaming machine via the phone and, optionally, cashes out any winnings. While no actual game-play occurs on the phone, the phone is used for accessing the player's assets and gaming outcomes on the gaming machine 10.

Optionally, the wagering game provides the player with access to accumulated assets and/or certain awards only if the player achieves a "Remote Play Winning Outcome." If the player achieves this outcome (e.g., in a basic or bonus game), then he or she is allowed remote access to one or more of the accumulated assets and/or certain awards. For example, if the player achieves the "Remote Play Winning Outcome," the player can have the option to select a smaller award while the player is physically present at the gaming machine 10 or a larger award if the player uses the telephone. In another example, the player may be given the option to play for smaller awards while the player is physically present at the gaming machine 10 or for larger awards if the player uses the telephone for game-play initiation.

Alternative to using a voice telephone call to initiate a game or to access assets and/or awards, as described above, the player can send a text message. For example, the player can send a special code in the text message to log-in using a special number on the gaming machine 10.

For identification purposes, various verification ways can be used. For example, the player can enter the mobile telephone number into the gaming machine 10 as a player identification number. When the phone is near, the gaming machine 10 can detect it and verify the player identification number, e.g., the mobile number. For example, a receiver can be installed in the gaming machine 10 for detecting a mobile identifier (which may include the mobile number) that is periodically transmitted by mobile phones to the nearest mobile base station. Thus, the gaming machine 10 would have similar capabilities to the mobile base station.

Alternatively, the gaming machine 10 can send a voice or text message to the mobile telephone to verify the player's identification number. For example, the gaming machine 10 can send a text message asking the player to reply to the text message using a predetermined code for confirmation purposes. Optionally, a Bluetooth identifier can be used for logging-in and/or verification purposes, wherein the Bluetooth identifier is unique per phone and/or service carrier.

Special benefits can be offered to a player based on the telephone brand and/or service carrier. For example, predetermined assets can be made available to the player only if they use a telephone of brand X that uses service carrier Y. Optionally, the special benefits can be made available based on the telephone model.

While the present invention has been described with reference to one or more particular embodiments, those skilled in the art will recognize that many changes may be made thereto without departing from the spirit and scope of the present invention.

Each of these embodiments and obvious variations thereof is contemplated as falling within the spirit and scope of the claimed invention, which is set forth in the following claims.

What is claimed is:

1. A method, comprising:

receiving wager inputs, via wager input devices, from players at respective gaming machines of a plurality of linked gaming machines;

conducting the wagering games at the respective gaming machines in response to receiving the wager inputs;

displaying the wagering games on respective display devices of the plurality of linked gaming machines;

using one or more controllers for determining a player level for each player based on certain criteria occurring at the player's gaming machine;

using at least one of the controllers for determining a payback percentage for the player's gaming machine based on both the player level of the player at the player's gaming machine and player levels of the players at other respective gaming machines of the plurality of linked gaming machines;

using at least one of the controllers for changing the payback percentage based on changes, occurring during the wagering games, to the player level of the player at the player's gaming machine and the player levels of the players at the other respective gaming machines of the plurality of linked gaming machines; and using at least one of the controllers for assigning the changed payback percentage to the player's gaming machine.

2. The method of claim 1, wherein the plurality of linked gaming machines includes a first gaming machine on which a first player of the plurality of players is conducting one or more of the wagering games, the first gaming machine having a higher payback percentage than payback percentages at the other respective gaming machines of the plurality of linked gaming machines due to a high player level of the first player, the payback percentages of the other respective gaming machine increasing in response to the high player level of the first player.

3. The method of claim 1, further comprising displaying the payback percentage in real time on the display device of the player's gaming machine.

4. The method of claim 1, wherein the certain criteria is selected from a group consisting of receiving a certain combination of symbols in the wagering game and achieving a certain event.

5. The method of claim 1, wherein the certain criteria is selected from a group consisting of frequency of wager input, turnover, winnings, elapsed time from last wager, number of wagering sessions, and number of played wagering games.

6. A method of playing wagering games, comprising:

receiving first wager inputs, via a first input device, from a first player to play a first wagering game at a first gaming machine and second wager inputs, via a second input device, from a second player to play a second wagering game at a second gaming machine;

based on certain criteria, using one or more controllers for determining a first player level of the first player playing the first wagering game at the first gaming machine and a second player level of the second player playing the second wagering game at the second gaming machine;

using at least one of the controllers for determining a first payback percentage based on both the first player level and the second player level;

using at least one of the controllers for assigning the first payback percentage to the first gaming machine;

terminating the second player's play of the second wagering game at the second gaming machine;

receiving third wager inputs, via the second input device, from a third player to play a third wagering game at the second gaming machine;

based on the certain criteria, using at least one of the controllers for determining a third player level of the third player playing the third wagering game at the second gaming machine;

using at least one of the controllers for determining a second payback percentage based on both the first player level and the third player level; and using at least one of the controllers for replacing the first payback percentage with the second payback percentage and assigning the second payback percentage to the first gaming machine, the second payback percentage being different than the first payback percentage;

wherein the first payback percentage and the second payback percentage fluctuate based on fluctuations of the first player level, the second player level, and the third player level occurring during the respective ones of the first wagering game, the second wagering game, and the third wagering game.

7. The method of claim 6, wherein at least two wagering games of the first wagering game, the second wagering game, and the third wagering game are the same.

8. The method of claim 6, wherein at least two wagering games of the first wagering game, the second wagering game, and the third wagering game are different from each other.

9. The method of claim 6, wherein the first wagering game is the same as the second wagering game and the second wagering game is different than the third wagering game.

10. The method of claim 6, wherein the first payback percentage is a function of a weighted average of the first player level and the second player level and the second payback percentage is a function of a weighted average of the first player level and the third player level.

11. The method of claim 6, wherein the certain criteria is selected from a group consisting of receiving a certain combination of symbols in the wagering game and achieving a certain event.

12. The method of claim 6, further comprising displaying in real time the first payback percentage and the second payback percentage.

13. A gaming system comprising:

a plurality of linked gaming machines, each of the plurality of linked gaming machines including a display for displaying a plurality of symbols that indicates a randomly selected outcome of a wagering game that has been selected from a plurality of outcomes in response to a wager input, the wager input being received from each of a plurality of players; and a controller linked to the plurality of linked gaming machines, the controller being programmable to determine, for each of the plurality of players at a respective one of the plurality of linked gaming machines, a player level based on certain criteria occurring at the player's gaming machine during the wagering game, determine a payback percentage for the player's gaming machine based on both the player level of the player at the player's gaming machine and player levels of the players at other respective gaming machines of the plurality of linked gaming machines;

change the payback percentage based on changes, occurring during the wagering game, to the player level of the player at the player's gaming machine and the player levels of the players at the other respective gaming machines of the plurality of linked gaming machines; and assign the changed payback percentage to the players' gaming machine.

14. The gaming system of claim 13, wherein the plurality of linked gaming machines includes a first gaming machine on which a first player of the plurality of players is conducting the wagering game, the first gaming machine having a higher payback percentage than payback percentages at the other respective gaming machines of the plurality of linked gaming machines due to a high player level of the first player, the payback percentages of the other respective gaming machine increasing in response to the high player level of the first player.

15. The gaming system of claim 13, wherein the payback percentage is displayed in real time on the display of the player's gaming machine.

16. The gaming system of claim 13, wherein the certain criteria is selected from a group consisting of receiving a certain combination of symbols in the wagering game and achieving a certain event.

17. The gaming system of claim 13, wherein the certain criteria is selected from a group consisting of frequency of wager input, turnover, winnings, elapsed time from last wager, number of wagering sessions, and number of played wagering games.

18. The gaming system of claim 13, wherein the player level is achieved by the player based on at least one of the player receiving a certain combination of symbols in the wagering game, the player achieving a certain event, the player wagering a certain amount within a certain time period, or the player wagering a certain amount within a series of plays of the wagering game.

19. A gaming system comprising:

a plurality of linked gaming machines including a first gaming machine and a second gaming machine, each of the plurality of linked gaming machines including a display for displaying a randomly selected outcome that has been selected from a plurality of outcomes in response to wager inputs, the wager inputs being received from a plurality of players including a first player, a second player, and a third player; and a controller linked to the plurality of linked gaming machines, the controller being programmable to based on certain criteria, determine a first player level, a second player level, and a third player level, in response to the first gaming machine being played by the first player and the second gaming machine being played by the second player, determine a first payback percentage based on the first player level and the second player level, assign the first payback percentage to the first gaming machine, in response to the first gaming machine being played by the first player and the second gaming machine being played by the third player, determine a second payback percentage based on the first player level and the third player level, and replace the first payback percentage with the second payback percentage and assign the second payback percentage to the first gaming machine, the second payback percentage being different than the first payback percentage;

wherein the first payback percentage and the second payback percentage fluctuate based on fluctuations of the first player level, the second player level, and the third player occurring during the wagering game.

20. The gaming system of claim 19, wherein the first payback percentage is a function of a weighted average of the first player level and the second player level and the second payback percentage is a function of a weighted average of the first player level and the third player level.

21. The gaming system of claim 19, wherein the certain criteria is selected from a group consisting of receiving a certain combination of symbols in the wagering game and achieving a certain event.

* * * * *